(12) United States Patent
Campos et al.

(10) Patent No.: US 9,065,523 B2
(45) Date of Patent: Jun. 23, 2015

(54) MULTIPLE-INPUT MULTIPLE-OUTPUT (MIMO) COMMUNICATION SYSTEM

(71) Applicant: Cable Television Laboratories, Inc., Louisville, CO (US)

(72) Inventors: Luis Alberto Campos, Superior, CO (US); Jennifer Andreoli-Fang, Boulder, CO (US); Joey Padden, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 14/181,643

(22) Filed: Feb. 15, 2014

(65) Prior Publication Data

US 2014/0233661 A1    Aug. 21, 2014

Related U.S. Application Data

(63) Continuation-in-part of application No. 13/769,288, filed on Feb. 16, 2013.

(60) Provisional application No. 61/845,340, filed on Jul. 11, 2013.

(51) Int. Cl.

| | |
|---|---|
| *H04B 7/12* | (2006.01) |
| *H04B 7/04* | (2006.01) |
| *H04B 7/06* | (2006.01) |
| *H04B 1/707* | (2011.01) |
| *H04B 3/32* | (2006.01) |
| *H04L 27/26* | (2006.01) |

(52) U.S. Cl.
CPC .............. *H04B 7/12* (2013.01); *H04B 7/0413* (2013.01); *H04B 7/0617* (2013.01); *H04B 7/068* (2013.01); *H04B 1/707* (2013.01); *H04B 3/32* (2013.01); *H04L 27/2601* (2013.01)

(58) Field of Classification Search
CPC ........ H04B 7/12; H04B 7/0413; H04B 7/022; H04B 7/0617; H04B 7/0691; H04B 7/10; H04B 1/707; H04B 3/32; H04B 7/068; H04W 88/06; H04W 48/16; H04W 4/02; H04W 4/04; H04W 72/005; H04W 28/065
USPC ......... 375/219, 220, 222, 223, 229, 257, 259, 375/286, 295, 316, 349, 359, 377
See application file for complete search history.

(56) References Cited

U.S. PATENT DOCUMENTS

| | | |
|---|---|---|
| 5,185,763 A | 2/1993 | Krishnan |
| 6,941,079 B1 | 9/2005 | Barozzi |
| 8,223,872 B1 | 7/2012 | Zhang |

(Continued)

FOREIGN PATENT DOCUMENTS

| | | |
|---|---|---|
| WO | 2005/062498 | 7/2005 |
| WO | 2011/161637 | 12/2011 |

*Primary Examiner* — Hirdepal Singh
(74) *Attorney, Agent, or Firm* — Great Lakes Intellectual Property, PLLC

(57) ABSTRACT

A multiple-input multiple-output (MIMO) capable system is contemplated. The communication system may include a signal processor configured to separate an input stream into multiple signal paths to facilitate simultaneous transport through a communication medium. The capability to simultaneously transmit multiples signal paths may be beneficial in order to maximize throughput and/or minimize expense.

10 Claims, 18 Drawing Sheets

(56) References Cited

U.S. PATENT DOCUMENTS

| | | | |
|---|---|---|---|
| 2005/0063340 A1 | 3/2005 | Hoffman | |
| 2005/0105632 A1* | 5/2005 | Catreux-Erces et al. | 375/267 |
| 2005/0174935 A1 | 8/2005 | Segel | |
| 2006/0234663 A1 | 10/2006 | Wilhoyte | |
| 2007/0032220 A1* | 2/2007 | Feher | 455/404.1 |
| 2007/0054625 A1 | 3/2007 | Beale | |
| 2009/0028192 A1* | 1/2009 | Rieger et al. | 370/535 |
| 2009/0204877 A1* | 8/2009 | Betts | 714/806 |
| 2011/0019723 A1 | 1/2011 | Lerner | |
| 2011/0243025 A1 | 10/2011 | Kim | |
| 2012/0206285 A1 | 8/2012 | Khlat | |
| 2012/0281621 A1 | 11/2012 | Loftallah | |
| 2012/0331111 A1* | 12/2012 | Wu et al. | 709/219 |
| 2013/0201316 A1* | 8/2013 | Binder et al. | 348/77 |
| 2013/0215833 A1* | 8/2013 | Ong et al. | 370/329 |
| 2014/0066098 A1* | 3/2014 | Stern et al. | 455/456.3 |
| 2014/0206367 A1* | 7/2014 | Agee et al. | 455/450 |
| 2014/0302802 A1* | 10/2014 | Chang et al. | 455/78 |
| 2014/0321565 A1* | 10/2014 | Campos et al. | 375/267 |
| 2014/0342659 A1* | 11/2014 | Maharajh et al. | 455/3.01 |

\* cited by examiner

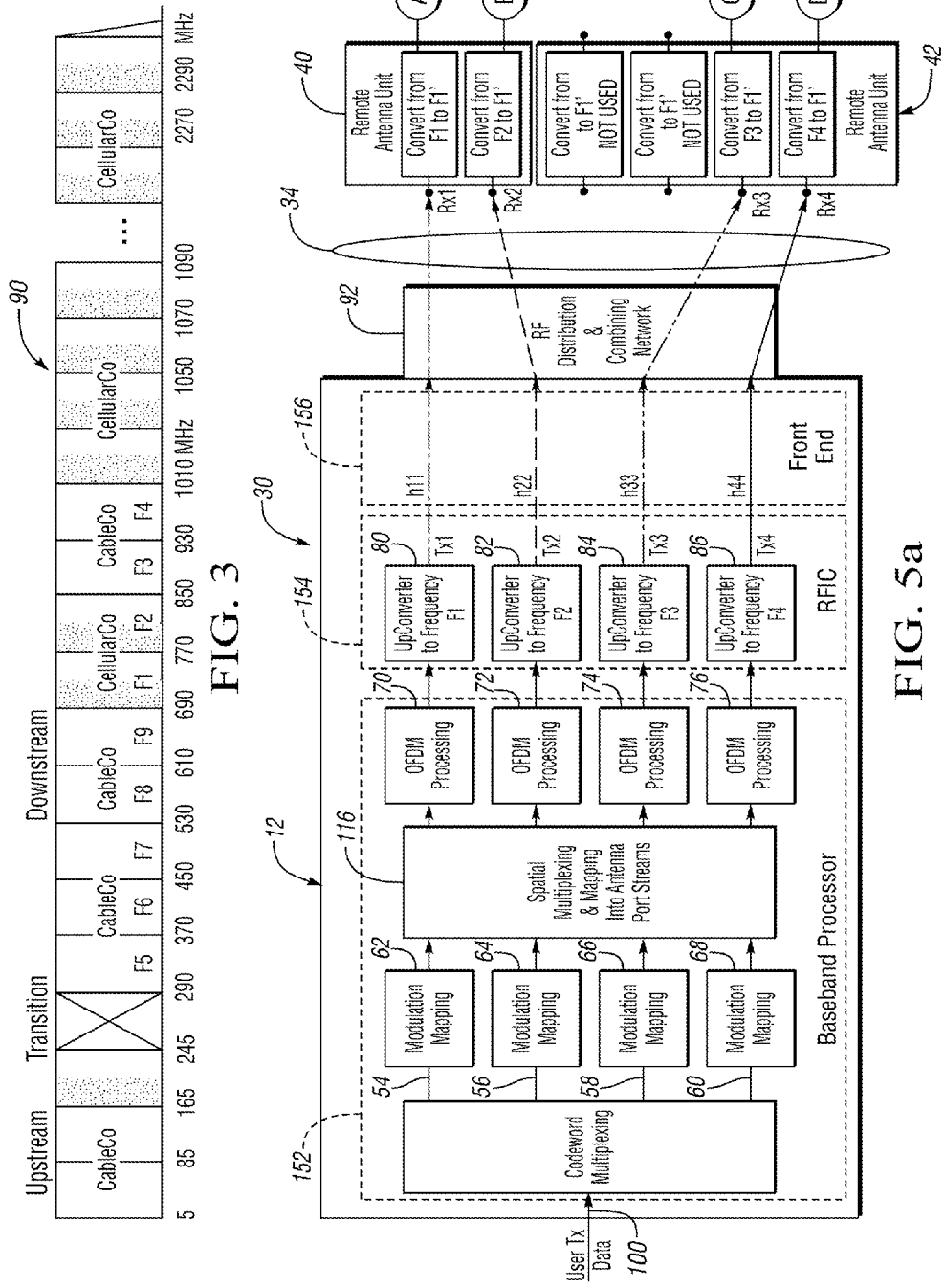

MULTIPLE-INPUT MULTIPLE-OUTPUT (MIMO) COMMUNICATION SYSTEM

CROSS-REFERENCE TO RELATED APPLICATIONS

This application is a continuation-in-part of U.S. application Ser. No. 13/769,288, filed Feb. 16, 2013, and claims the benefit of U.S. provisional application No. 61/845,340 filed Jul. 11, 2013, the disclosures of which are incorporated in their entirety by reference herein.

TECHNICAL FIELD

The present invention relates to communication systems and signal processors, such as but not necessarily limited to those capable of facilitating multiple-input multiple-output (MIMO) or multipath communications.

BACKGROUND

Wireless communications systems may employ multiple-input multiple-output (MIMO) techniques to facilitate multipath communications. The multipath capabilities of MIMO systems allow data to be transmitted simultaneously over multiple paths between a plurality of transmitting devices and a plurality of receiving devices to effectively increase capacity over single path systems.

BRIEF DESCRIPTION OF THE DRAWINGS

FIG. 3 illustrates a frequency selection map in accordance with one non-limiting aspect of the present invention.

FIG. 5a-5b schematically illustrates operation of the communication system when facilitating wireless signaling having enhanced spatial diversity in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
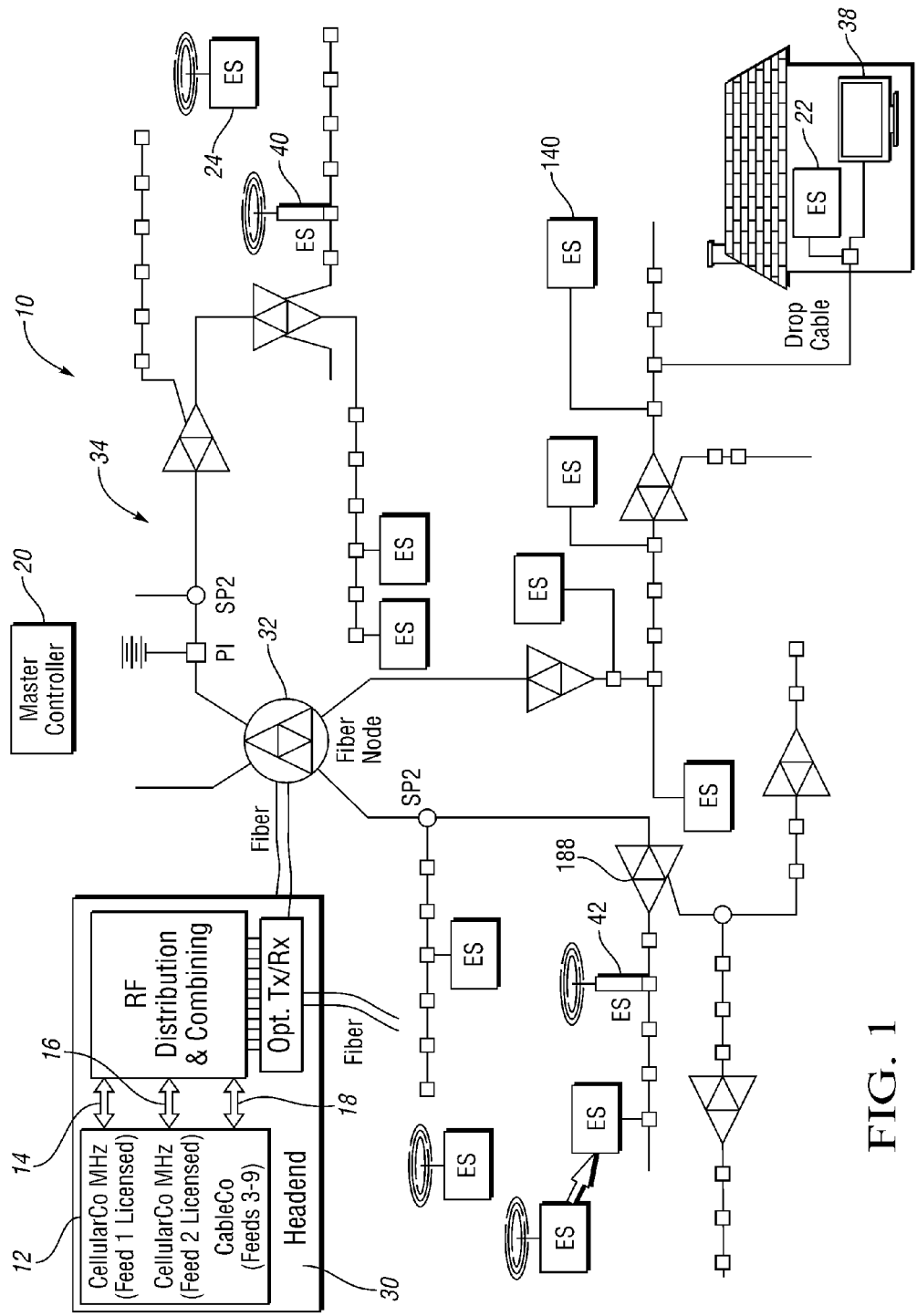
FIG. 1 illustrates a multiple-input multiple-output (MIMO) communication system in accordance with one non-limiting aspect of the present invention.

FIG. 1 illustrates a multiple input multiple output (MIMO) communication system 10 in accordance with one non-limiting aspect of the present invention. The system 10 may be configured to facilitate electronic signaling between a signal processor 12 and one or more end stations (ES), user equipment (UE), access points (APs), terminals or other devices. The signal processor 12 may be configured to facilitate transport of virtually any type of signaling, including signaling associated with a multiple system operator (MSO), such as but not necessarily limited to a cable, satellite, or broadcast television service provider, a cellular service provider, and high-speed data service provider, an Internet service provider (ISP), etc. The communication system 10 is illustrated with respect to the signal processor 12 supporting a first feed 14, a second feed 16, a third feed 18 (representing seven independent feeds), although more or less feeds may be received for transport. Each feed 14, 16, 18 may include data communicated to the signal processor 12 from a local or remote sourcing device/entity as a baseband or other suitable signal. Each feed may be processed for transport with the signal processor 12, optionally with the signal processor 12 comprising separate or independent signal processors for each feed. The first and second feeds 14, 16 may be associated with cellular related signaling (e.g., signaling associated with a cellular phone call) and the third feed 18 may be associated with cable related signaling (e.g., signaling associated with delivery of a television program and/or Internet data download). A master controller 20 may be included as a standalone component and/or integrated into one of the illustrated components in order to facilitate the operations contemplated herein.

The end stations ES correspond with any electronically operable device having capabilities sufficient to facilitate directly or indirectly interfacing a user with signaling transported through the communication system 10. The end stations ES may be a gateway, a router, a computer, a mobile phone, a cellular phone, a media terminal adapter (MTA), a voice over Internet protocol (VoIP) enabled device, a television, a set top box (STB), network address translator (NAT), etc. For exemplary non-limiting purposes, a first end station 22 is shown to be a wireline type of device, such as a home gateway or set-top box configured to output signaling to a television or other device through a wireless and/or wired connection, and a second end station 24 is shown to be a wireless type of device, such as a remote antenna unit, wireless computer, television or cellular phone, optionally having capabilities sufficient to interface signaling using a wireless and/or a wired connection, such as the manner described in U.S. patent application Ser. No. 14/181,641, entitled Multiple-Input-Multiple-Output (MIMO) Communication System, filed Feb. 15, 2014, the disclosure of which is hereby incorporated by reference in its entirety. The use of such first and second end stations 22, 24 may be beneficial in facilitating continued access to a television program while a user travels between locations associated with the first and second ends stations 22, 24. Seamless access to the content may be provided in this manner using different ends stations or capabilities of the end stations, e.g., a wireless capability of the second end station 24 may be used when at one location and a wireline capability of the first end station 22 may be used when at another location.

The present invention contemplates distinguishing between wireless and wireline communications. The wireline communications may correspond with any type of electronic signal exchange where a wire, a coaxial cable, a fiber or other bound medium is used to facilitate or otherwise direct at least a portion of the related signaling, including the signaling exchanged outside of the communicating device/processor. The wireline communications include but are not necessarily limited to those carried at least partially over a fiber/cable backbone associated with a cable television distribution system or an Internet or non-Internet based data communication system. The wireless communications may correspond with any type of electronic signal exchange where an antenna, antenna port or other transmitting type of device is used to communicate at least a portion of the signaling as radio frequency (RF) signals, such as over a wireless link or through an unbound or air medium, optionally in the manner described in U.S. patent application serial number. The wireless communications include but are not necessary limited to satellite communications, cellular communications and Wi-Fi communications. The use of wireline and wireless communications and the corresponding mediums are not intended to limit the present invention to any particular type of medium, protocol, or standard and is instead noted to differentiate between two types of communications, e.g., bound and unbound.

The signaling desired for transport through the communication system 10 may be received at a headend unit 30 associated with the signal processor 12 and thereafter carried by one or more fibers to a fiber node 32, such as the manner described in U.S. patent application Ser. No. 14/181,640, entitled Multiple-Input-Multiple-Output (MIMO) Communication System, filed Feb. 15, 2014, the disclosure of which is hereby incorporated by reference in its entirety. The fiber node 32 may be part of a cable television distribution system 34 from which a plurality of coaxial cables may facilitate further delivery to different geographical areas, optionally with use of splitters and/or amplifiers. The coaxial cables are shown to include a plurality of taps (shown as rectangles) through which various end stations ES may be connected to receive the wireline signaling and/or other signaling associated with the headend, e.g., signaling associated with other types of content and/or data transmissions. The first end station 22 is shown to be connected to one of the taps to facilitate interfacing transported signals to a locally connected, first user equipment (UE) 38. Using LTE over HFC, communications between end station 22 and UE 38 can take place through the signal processor 12 but not directly. Communications between end station 22 and UE 38 can take place directly if other means of communications are used such as WiFi or MoCA or Ethernet. Communications between end station 22 and UE 38 can also take place using LTE over HFC but over a separate system where end station 22 also has signal processor functionality and the UE 38 functions as an end station of this local "home LTE over HFC network". The first end station 22 may be configured to facilitate processing of frequency diverse signals for wireline and/or wireless communication to the UE 38, which is shown to be a television but could be any other type of device, such as a mobile phone, tablet, etc. having capabilities sufficient to access television or data signaling using one or both of a wired and wireless connection. The first end station 22 may be configured to facilitate interfacing transported signals with the first UE 38 by converting frequency diverse signaling to an output signaling stream usable by the UE 38.

A third end station 40 is shown to be configured to facilitate wirelessly signaling with the second end station 24. The third end station 40 may be configured to convert the frequency diverse signals carried over the wireline distribution system 34 to spatially diverse signals or other suitable types of RF signals. The third end station 40 may be included as part of a Wi-Fi access point, a router, a cellular tower, a base station, etc. The ability of the third end station 40 to output wireless signaling may be beneficial if licensing or other restrictions limit how the wireless signals can be transmitted from the third end station 40, e.g., frequency usage restrictions may prevent output of the frequency diverse signals carried over the distribution system 34 to the second end station 24 without being pre-processed by the third end station 40. The third end station 40 may be configured to pre-process the frequency diverse signals carried over the distribution system 34 to suitable wireless signals having other frequency characteristics licensed for use with the second end station 24.

The third end station 40 may be configured to convert received wireline signaling to wireless signaling suitable to any restrictions associated with the second end station 24. The third end station 40 may be useful in allowing a user to access content through different types of devices and/or to facilitate use of other wireless transmission frequencies and communication mediums. The third end station 40 may be configured to facilitate output of spatially diverse signals according to frequency ranges allocated to an originator of the corresponding signaling stream. The second end station 24 may be a handset, mobile phone or other device having capabilities sufficient to process spatially diverse signaling, such as to facilitate interfacing a cellular phone call with the user (additional processing may be done at the second end station 24 to facilitate the phone call or other operation desired for the signaling stream). A fourth end station 42 may be configured to facilitate wirelessly interfacing transported signaling with the second end station 24, such as to enhance spatial diversity of the interfaced wireless signal in the manner described below in more detail.

Figure 2A:
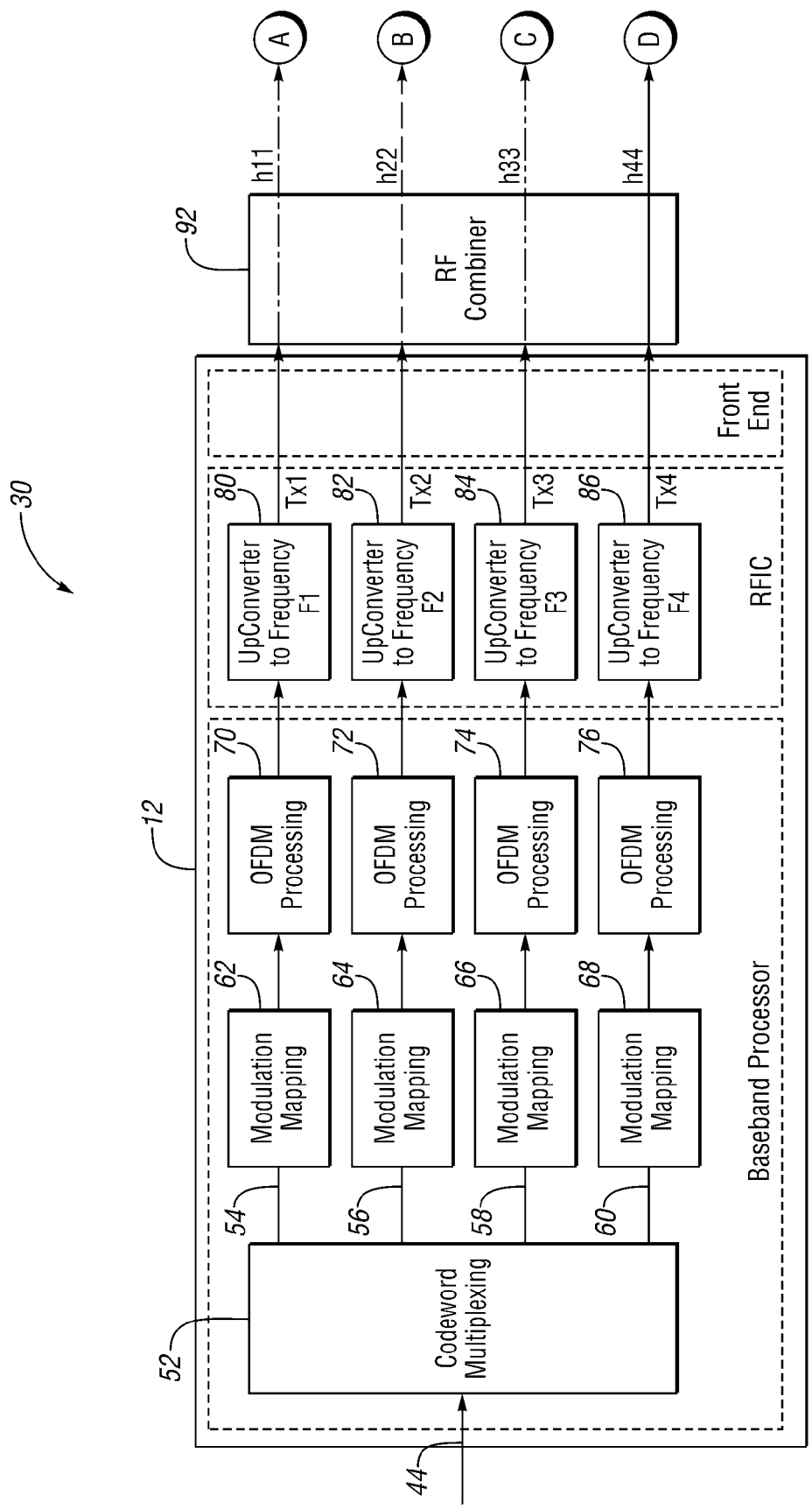
FIGS. 2a-2b schematically illustrate operation of the communication system when facilitating a wireline signaling mode in accordance with one non-limiting aspect of the present invention.
Figure 2B:
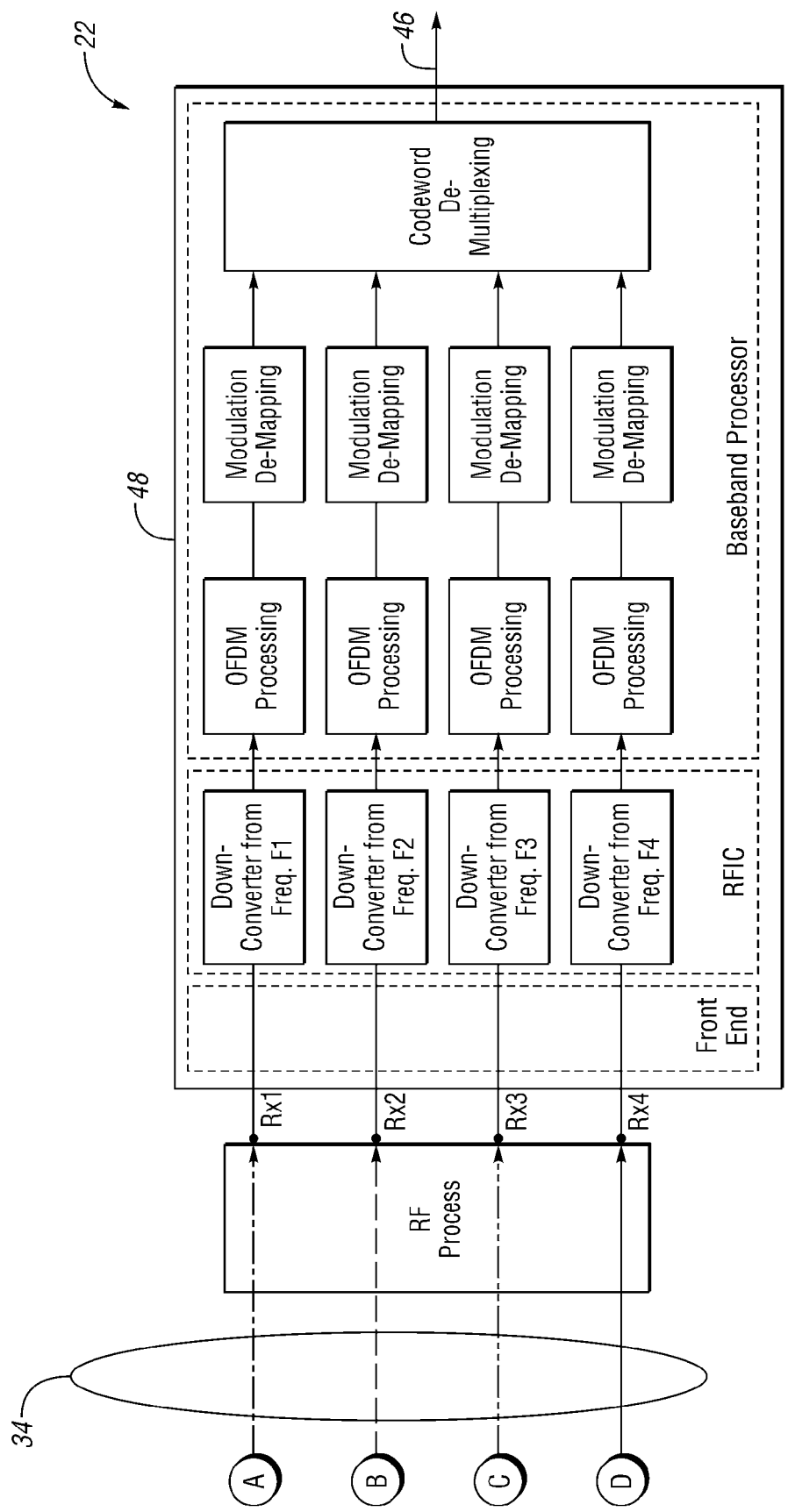

FIGS. 2a-2b schematically illustrate operation of the communication system 10 when facilitating a wireline signaling mode in accordance with one non-limiting aspect of the present invention. The wireline signaling mode corresponds with the signal processor 12 receiving an input signal 44, processing the input signal for transmission over at least a portion of the wireline communication medium 34, and the first end station 22 processing the transmitted signaling into an output signal 46. The output signal 46 may be subsequently transmitted to the first UE 38 or other device for final use. The signal processor 12 may be configured to receive the input signal from a base station, eNodeB, signal processor or other processing element desiring to transport signaling over the communication system (e.g., one of the feeds 14, 16, 18). The base station may be associated with an Internet service provider, a cable television sourcing entity, cellular phone provider or other source capable of providing data to the signal processor 12 for transport. The input signal 44 may be in the form of a baseband signal, a non-continuous wave (CW) type of signal and/or some other signaling/streaming sufficient to represent data, e.g. data represented using binary data bits/bytes and varying voltages or optical intensities. Optionally, the input signal 44 may be a non-diverse signal at least in that the data is carried within a single stream/signal as opposed to being divided for transmission using frequency diverse signaling and/or spatially diverse signaling.

The communication system 10 may be configured to facilitate transport of the input signal 44 (input data, message, video, audio, etc.) from an originating address associated with the sourcing entity to a destination address associated with the first UE 38 (or other end station). The present invention contemplates the signal processor 12 being configured to convert the input signal 44 to an intermediary signal prior to providing long-haul transport of the intermediary signal over one or more of the contemplated communication mediums so that the intermediary signal can be re-processed with another signal processor, such as with a signal processor 48 of the first end station 22 that converts the intermediary signal to the output signal 46. In this manner, the output signal 46 may take the same form as the input signal 44 prior to being processed with the first signal processor 12. Optionally, the second signal processor 48 may be configured to generate the output signal 46 as a different type of signal. The signal 46 as it comes out of signal processor 48 may not be frequency or spatially diverse, e.g., signal 46 may need another processor like 12 to regenerate back spatial or frequency diverse signals. This would most likely be to implement a home "LTE over HFC" network that extends from the larger coverage LTE over HFC access network. Another way of extending frequency or spatially diverse signals may include using an end station similar to end station 40 and converting to spatially or frequency diverse signals without use of a signal processor similar to the processor 48. The second signal processor 48 may be configured to assess the signaling capabilities of the first UE 38 and to adjust the characteristics of the output signal 46 to operate with the capabilities of the first UE 38.

The first signal processor 12 may include a codeword multiplexing device 52. The codeword multiplexing device 52 may be configured to multiplex the input signal 44 into a plurality of signal parts 54, 56, 58, 60. The codeword multiplexing device 52 is shown to be configured for non-limiting purposes to multiplex the input signal 44 into a first signal part 54, a second signal part 56, a third signal part 58 and a fourth signal part 60. The codeword multiplexer 52 may be configured to facilitate encoding the signal parts 54, 56, 58, 60 in/with codewords in order to enable additional robustness through addition of parity information. The codeword multiplexing device 52 may add extra bits to each signal part 54, 56, 58, 60 to increase robustness and the capability to reconstruct the original signal in case bits from one or more of the signaling parts 54, 56, 58, 60 are lost during communication. In a very benign environment, processing provided by the codeword multiplexing device 52 may be foregone, however, many applications, and in particular in MIMO, may practically require the additional robustness provided with the codewords. The use of four signal parts 54, 56, 58, 60 is believed to be beneficial as the particular implementation contemplates facilitating MIMO operations where the split parts correspond to four independent antenna ports. The codeword multiplexing device 52 may be configured to divide the input signal 44 into each of the signal parts 54, 56, 58, 60 such that each signal part 54, 56, 58, 60 carries at least a different portion of the input signal 44.

The signal processor 12 may include a plurality of modulation mapping devices 62, 64, 66, 68. The modulation mapping devices 62, 64, 66, 68 may be configured to format a received one of the first, second, third and fourth signal parts 54, 56, 58, 60 with respect to a constellation symbol. The mapping devices 62, 64, 66, 68, for example, may take a digital stream and convert that information into coordinate values defining different constellation symbols. The constellation symbols may correspond with a transport mechanism used within the communication system 10 to facilitate scheduling long-haul transmissions over the wireline communication 34, such as the constellation symbols associated with the MAP disclosed in U.S. patent application Ser. No. 12/954,079, the disclosure of which is hereby incorporated by reference in its entirety. In this manner, the modulation mapping devices 62, 64, 66, 68 may be configured to facilitate manipulating the data received from the codeword multiplexer 52 for actual transmission within the system 10. The modulation mapping devices 62, 64, 66, 68 may be configured to map or otherwise associate the bits/bytes output from the codeword multiplexer 52 with particular time periods and/or frequencies or other coordinates associated with transmission through the communication medium 34.

The signal processor 12 may include a plurality of orthogonal frequency division multiplexing (OFDM) processing devices 70, 72, 74, 76 (even though OFDM processing devices are included here as an example, other type of multicarrier or single carrier processing devices may be used). The OFDM processing devices 70, 72, 74, 76 may be configured to facilitate transmission of the received one of the first, second, third and fourth signal parts 54, 56, 58, 60 over a plurality of subcarriers. The OFDM processing devices 70, 72, 74, 76 may be configured to facilitate transmitting each signal part 54, 56, 58, 60 using an independent one of multiple narrowband subcarriers. The constellation symbol resulting from the modulation mapping devices 62, 64, 66, 68 may be used to define a plurality of values to which the particular subcarriers may be mapped. The use of multiple narrowband subcarriers may be beneficial in certain radio frequency environments compared to a single wideband carrier implementation. In principle, wideband carriers can also be used to carry frequency or spatially diverse information, however, the example of multiple narrowband subcarriers is used based on the likely environmental characteristics allowing it to provide better performance. The OFDM processing devices 70, 72, 74, 76 may be configured to translate a theoretical mapping provided by the modulation mapping devices 62, 64, 66, 68 for each signal part 54, 56, 58, 60 into actual signaling streams (spectrum) having specific parameters that will govern how the corresponding signals are actually transmitted beyond the signal processor 12. In this manner, the OFDM processing devices 70, 72, 74, 76 may be configured to map binary representations associated with the modulation mapping devices 62, 64, 66, 68 to the actual spectrum (e.g., signals received by the converter devices 80, 82, 84, 86).

The signal processor 12 may include a plurality of converter devices 80, 82, 84, 86. The converter devices 80, 82, 84, 86 may be configured to convert signaling associated with a received one of the first, second, third and fourth signal parts 54, 56, 58, 60 from a received frequency to a desired output frequency. The converter devices 80, 82, 84, 86 are shown to convert each of the first, second, third and fourth signal parts 54, 56, 58, 60 to a different frequency, which are correspondingly illustrated as a first frequency (F1), a second frequency (F2), a third frequency (F3) and a fourth frequency (F4). The conversion of each signal part 54, 56, 58, 60 output from the codeword multiplexing device 52 into a different frequency may be useful in providing frequency diversity. The frequency diversity enable the simultaneous transmission of multiple frequency multiplexed signals over medium 34, and thereby may allow more data to be transmitted than multiple spatially multiplexed signals over medium 110. Almost ideal or true orthogonality or diversity may be achieved over the HFC environment while spatial diversity over the wireless medium is not as efficient.

FIG. 3 illustrates a frequency selection map 90 in accordance with one non-limiting aspect of the present invention.

The frequency conversion map 90 may be used to facilitate selection of the frequency conversion performed with the signal processor converters 80, 82, 84, 86. The frequency selection map 90 may include a plurality of frequency intervals assigned to facilitate upstream and downstream transmissions within the communication medium 34. An additional interval of frequencies may be set aside as a transition boundary between upstream and downstream related frequencies in order to prevent fall off or other interferences between the upstream/downstream frequencies. The mapping table is shown to include a feed reference (F1, F2, F3, F4, F5, F6, F7, F8, and F9) within each one of the downstream intervals in order to illustrate certain frequency ranges set aside for particular feeds 14, 16, 18. One non-limiting configuration of the communication system 10 contemplates nine feeds being simultaneously transported downstream through the communication mediums without interfering with each other.

Each of the potentially supportable feeds 14, 16, 18 may be assigned to a particular one of the intervals depending on a mapping strategy, licensing strategy or other operational requirements. The frequencies of each feed 14, 16, 18 may be determined by an originator of the corresponding input signal 44. The signal processor 12 may identify the originator from additional information received with the corresponding input signal 44 in order to facilitate identifying which portion of the mapping table 90 has been allocated to support signal transmissions of that originator. A first interval of the downstream frequency spectrum ranging from 690-770 MHz has been allocated to support signaling associated with the originator of the first feed 14. A second interval the downstream frequency spectrum ranging from 770-850 MHz has been allocated support signaling associated with the originator of the second feed 16. The corresponding intervals of the downstream frequency spectrum allocated to the other feeds 18 as shown with reference to one of the illustrated F3, F4, F5, F6, F7, F8 and F9 designations.

When processing the first feed 14, the converter devices 80, 82, 84, 86 assigned to facilitate conversion of each corresponding signal part 54, 56, 58, 60 may be configured to select four different output frequencies from within the corresponding interval of the selection map, i.e., within 690-770 MHz. The particular frequency selected for each converter 80, 82, 84, 86 from within the 690-770 MHz interval may be determined in order to maximize a center frequency spacing, e.g., the first frequency (F1) may correspond with 710 MHz, the second frequency (F2) may correspond with 730 MHz, the third frequency (F3) may correspond with 750 MHz and the fourth frequency (F4) may correspond with 770 MHz. The intervals in the selection map 90 may be tailored to the particular center frequency offset in order to facilitate desired frequency spacing, which for exemplary non-limiting purposes has been selected to correspond with 20 MHz. The signal processor 12 may include a separate set of devices to support simultaneous transmission of the second feed 16 whereby the corresponding converters may be configured to output the signal parts associated with the second feed at 790 MHz, 810 MHz, 830 MHz and 850 MHz. (The devices used to support the additional feeds are not shown however they would duplicate the devices illustrated in FIG. 2 with additional duplicates optionally being included to support additional feeds.)

The signal processor 12 may include a combiner 92 configured to receive the signal parts 54, 56, 58, 60 from the converter devices 80, 82, 84, 86 as well as other signal processors as described here or from other processors from other services carried over the CATV networks. The combiner 92 may be configured to aggregate the received frequency diverse signals for transport over the communication medium 34. The combiner 92 may be configured to prepare the received first, second, third and fourth signal parts 54, 56, 58, 60 for transmission to a laser transmitter (see optical transmitter/receiver (opt. Tx/Rx) in FIG. 1) to facilitate subsequent modulation over an optical medium and/or for transmission directly to a hybrid fiber coaxial (HFC) or other wired communication medium 34. The laser transmitter may be configured to receive the signaling (h11, h22, h33, h44) from the combiner 92 as a single/common input to be subsequently modulated for transport over one or more of the fibers and/or coax portions of the communication medium 34. The communication medium 34 may be used to facilitate long-haul transport of the signal parts 54, 56, 58, 60 for subsequent receipt at the first end station 22. This type of long-haul transport of frequency diverse signaling, derive from processing the non-frequency diverse signaling received at the input 44 to the signal processor, may be helpful in maximizing signaling throughput.

The second signal processor 48 may include a processor, a plurality of down-converter devices, a plurality of OFDM processing devices or alternative multicarrier or single carrier processing devices, a plurality of modulation de-mapping devices and a codeword de-multiplexing device. These devices may be configured to facilitate inverse operations to those described above with respect to the signal processor 12 in order to facilitate generating the output signal 46. While the signal processors 12, 48 are described with respect to including various devices to facilitate the contemplated signal transmission, the signal processors 12, 48 may include other electronics, hardware, features, processors, or any other sufficient type of infrastructure having capabilities sufficient to achieve the contemplated signal manipulation. The first end station 22, in particular, may include an output port or other interface to facilitate communication of the output signal 46 to the first UE 38. In this manner, the communication system 10 may be configured to facilitate wireline signaling between the signal processor 12 and the first end station 22. FIG. 2 describes signaling corresponding with a downstream direction for exemplary purposes as an equivalent but inverse set of components going in the uplink direction may be included to facilitate similar processes in a reverse or inverse order to facilitate upstream signaling.

Figure 4A:
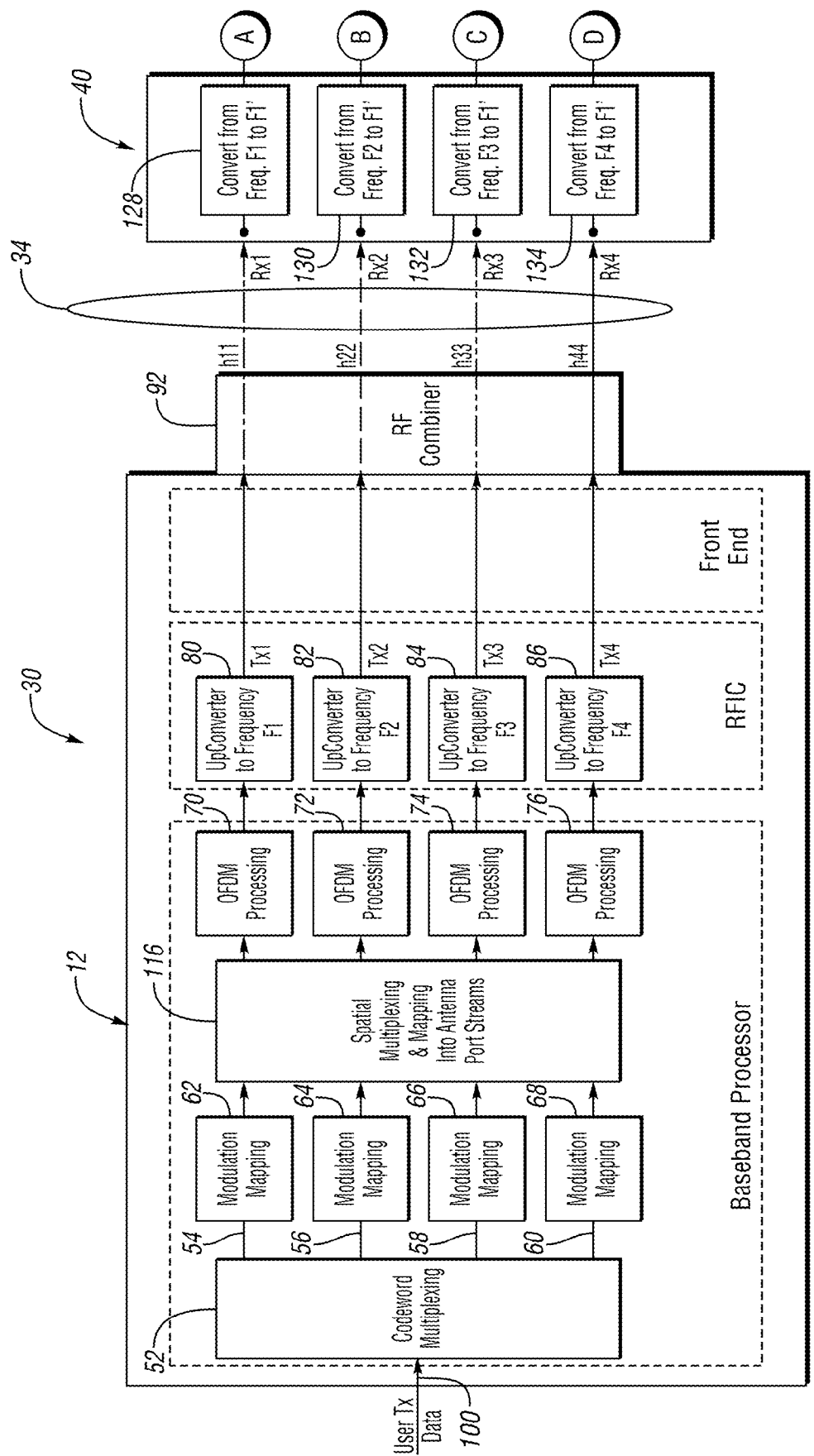
FIGS. 4a-4b schematically illustrate operation of the communication system when facilitating a wireless signaling mode in accordance with one non-limiting aspect of the present invention.
Figure 4B:
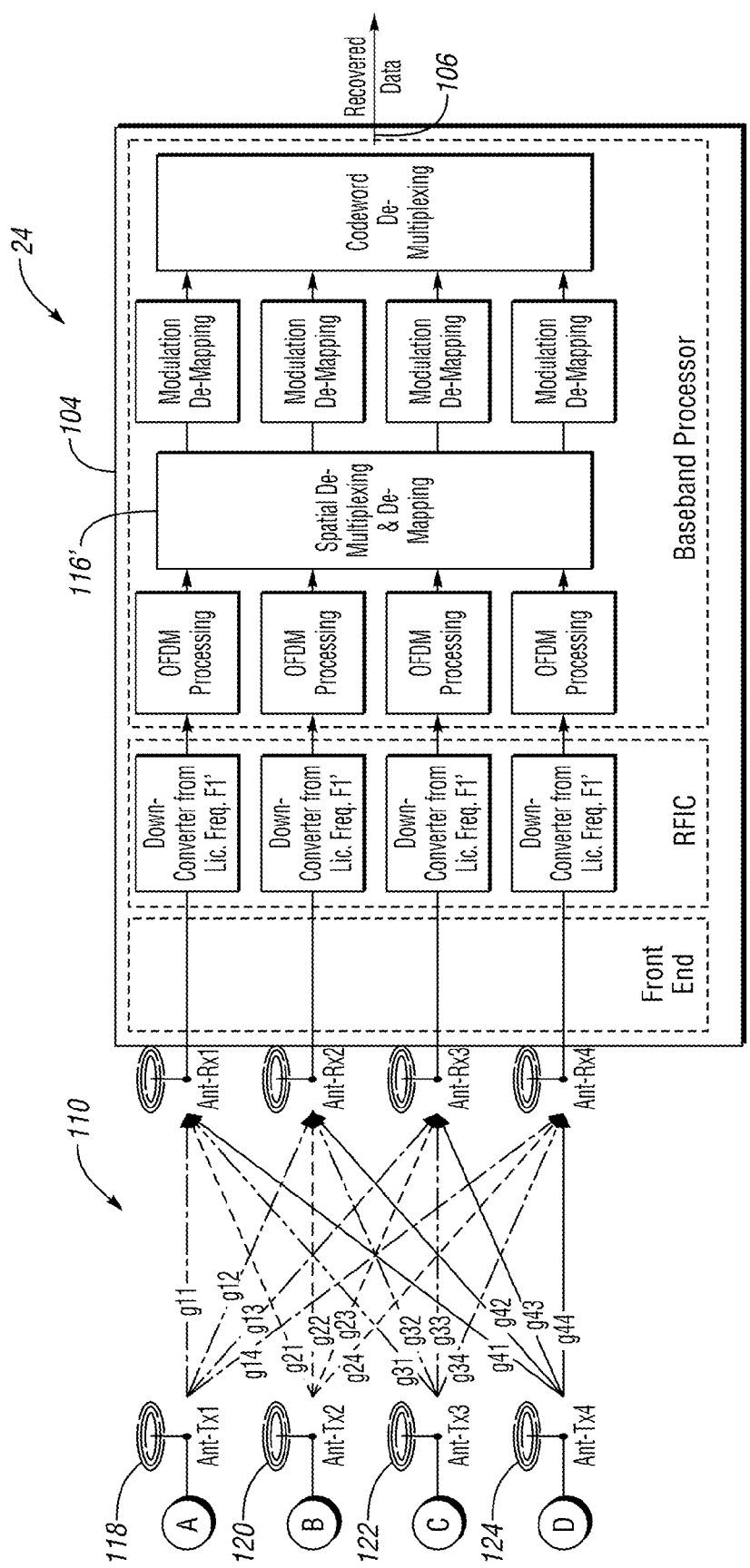

FIGS. 4a-4b schematically illustrate operation of the communication system 10 when facilitating wireless signal in accordance with one non-limiting aspect of the present invention. The wireless signaling may be similar to the signaling described with respect to FIG. 2 in that an input signal 100 received at the first signal processor 12 is converted to an intermediary signal (combined into a single/common output to laser transmitter, which is shown for exemplary purposes as having four equivalent parts—h11, h22, h33, h44) for transmission to a second signal processor 104 for conversion to an output signal 106. The illustration associated with FIG. 4 differs from that in FIG. 2 at least in that the intermediary signal traverses at least part of the distance between the first and second signal processors 12, 104 through a wireless medium 110. In particular, FIG. 4 illustrates a scenario where the intermediary signal is transmitted initially through the wireline communication medium 34 and thereafter through the wireless communication medium 110, which may correspond with a signal traveling from the headend unit 30 through the third end station 40 for wireless receipt at the second end station 24 (see FIG. 1).

The configuration shown in FIG. 4 may have many uses and applications, including supporting cellular telephone services, or other services that are at least partially dependent on wireless or RF signaling, such as where a provider desires to obtain certain benefits associated with transporting signaling at least partially through the wireline communication medium 34. The ability to at least partially rely on the wireline communication medium 34 may be beneficial in facilitating long-haul transport of the corresponding signaling (intermediary signal) in a manner that maximizes throughput and minimizes interference or other signaling loss that may otherwise occur if transmitted solely through wireless mediums. The third end station 40 may be included between the first and second end stations 22, 24 to facilitate interfacing the wireline communication medium 34 with the wireless communication medium 110. Optionally, the third end station 40 may be positioned as close to the second end station 24 as possible in order to maximize use of the wireline communication medium 34 and/or the third end station 40 may be included as part of the first end station 22 in order to maximize wireless communication.

The first and second signal processors 12, 104 shown in FIG. 4 may be configured similarly to the corresponding signal processors shown in FIG. 2. The elements illustrated in FIG. 4 with the same reference numerals, unless otherwise noted, may be configured to perform in the same manner as those described above with respect to FIG. 2. The first and second signal processors 12, 104 of FIG. 4 may include an additional device to facilitate supporting the at least partial wireless communication, which is referred to as a spatial multiplexing and mapping device 116 and its corresponding inverse 116'. The spatial multiplexing device 116 may be configured to facilitate spatial diversity of the signal parts output from the modulation mapping devices 62, 64, 66, 68. The spatial multiplexing and mapping device 116 may be configured to add delay to one or more of the signal parts 54, 56, 58, 60 or modify these signal parts in different ways in order to facilitate spatially separating each signal part 54, 56, 58, 60 from one another. This may be beneficial in order to enhance the spatial diversity of antennas 118, 120, 122, 124, which may be individually used to transmit the signal parts 54, 56, 58, 60.

The third end station 40 may be configured to receive the frequency diverse signaling output from the combiner 92. The third end station 40 may include converter devices 128, 130, 132, 134 or additional features sufficient to facilitate converting the received frequency diverse signaling to spatially diverse signaling. The third end station 40 may include one converter device 128, 130, 132, 134 for each of the received signal parts, i.e., a first converter 128 for the first signal part 54, a second converter 130 for the second signal part 56, a third converter 132 for the third signal part 58 and a fourth converter 134 for the fourth signal part 60. Each converter 128, 130, 132, 134 may be configured to convert the frequency of the received signal part to a common frequency in order to translate frequency diversity over medium 34 to spatial diversity over medium 110. The common frequency may correspond with a frequency licensed by an originator of the input signal 100, e.g., wireless frequency ranges purchased by cell phone service providers and/or another frequency range otherwise designated to be sufficient to facilitate subsequent wireless transmission to the second end station 24. The second end station 24 may include a separate antenna and separate active converter devices for each of the spatially diverse signal it receives in order to facilitate spatially receiving the signal parts to the second UE. FIG. 4 describes signaling corresponding with a downstream direction for exemplary purposes as an equivalent but inverse set of components going in the uplink direction may be included to facilitate similar processes in a reverse or inverse order to facilitate upstream signaling.

Figure 5B:
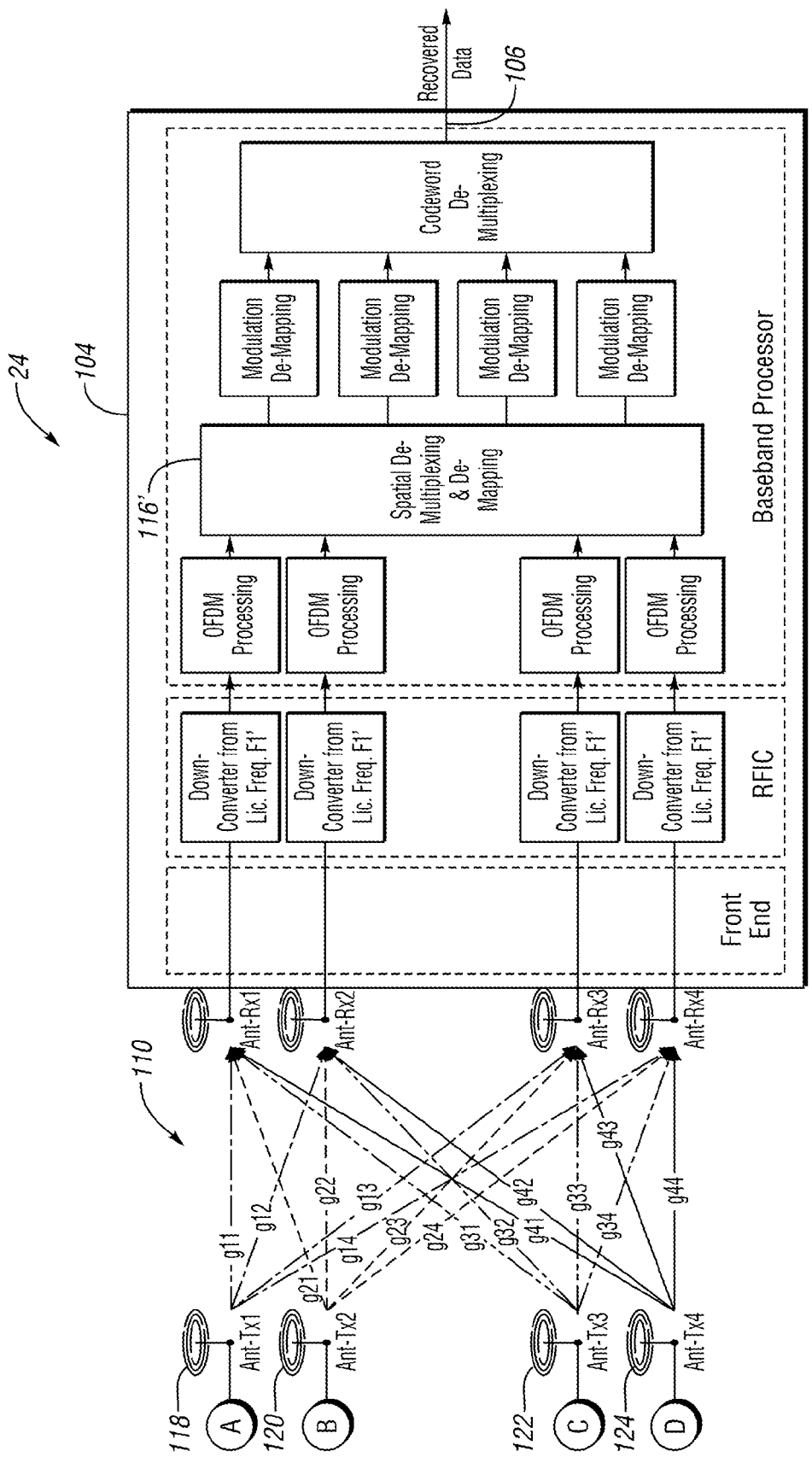

FIGS. 5a-5b schematically illustrates operation of the communication system 10 when facilitating wireless signaling having enhanced spatial diversity in accordance with one non-limiting aspect of the present invention. The wireless signaling may be similar to the signaling described with respect to FIGS. 2 and 4 at least in that the input signal 100 received at the first signal processor 12 is converted to an intermediary signal (combined into a single/common output to laser transmitter shown for exemplary purposes as having four equivalent parts—h11, h22, h33, h44) for transmission to the second signal processor 104 where it is then converted to the output signal 106. The illustration associated with FIG. 5 differs from that in FIG. 4 at least in that the intermediary signal traverses at least part of the distance between the first and second signal processors 12, 104 through the wireless medium 110 by way of two remote antenna units instead of one the selection and operation of which may be determined in the manner described in U.S. patent application Ser. No. 14/181,645, entitled Multiple-Input-Multiple-Output (MIMO) Communication System, filed Feb. 15, 2014, the disclosure of which is hereby incorporated by reference in its entirety. FIG. 5 illustrates a scenario where the intermediary signal is transmitted initially through the wireline communication medium 34 and thereafter through the wireless communication medium 110, which may correspond with signaling traveling from the headend unit 30 through the third end station 40 and the fourth end station 42 for wireless receipt at the second end station 24 (see FIG. 1). FIG. 5 provides enhanced spatial diversity for the wireless signals due to the third end station 40 being at a location physical different from or spatially distinct from the fourth end station 42.

One non-limiting aspect of the present invention contemplates the third and fourth end stations 40, 42 being physically spaced apart in order to enhance the spatial diversity of the wireless signals transmitted therefrom, at least in comparison to the wireless signaling shown in FIG. 4 to be transmitted solely from the third end station 40. The fourth end station 42 is shown to be connected to a different trunk, cable, fiber line, etc. than the third end station 40 in order to demonstrate the ability of the signal processor 12 to transmit signals to the second end station 24 using multiple, frequency diverse portions of the wired communication medium 34. The signal processor 12 may be configured to select from any number of end stations when determining the two or more end stations desired to communicate wireless signaling with the second end station. The two or more end stations may optionally included another end station that may be closer to the second end station and/or connected to the same trunk or feed, such as but not limited to a fifth end station 140 (see FIG. 1). In this manner, the signaling desired for receipt at the second end station may commonly originate from the signal processor and thereafter traverse different portions of the wired communication medium 34 and the wireless communication medium 110 prior to being re-joined and commonly received at the second end station 24. FIG. 5 describes signaling corresponding with a downstream direction for exemplary purposes as an equivalent but inverse set of components going in the uplink direction may be included to facilitate similar processes in a reverse or inverse order to facilitate upstream signaling.

Figure 6A:
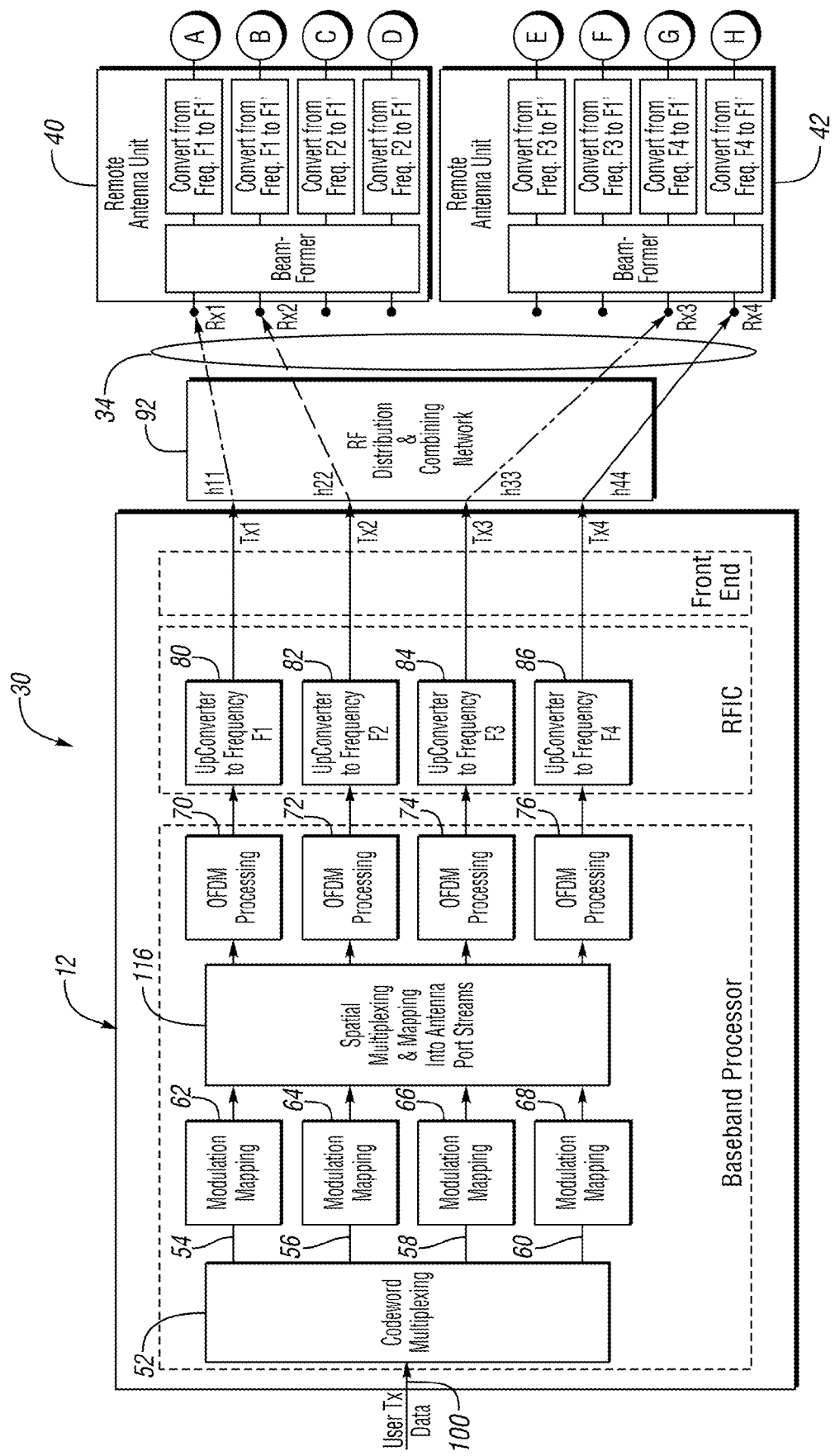
FIG. 6a-6b schematically illustrates operation of the communication system when facilitating wireless signaling having enhanced spatial diversity in accordance with one non-limiting aspect of the present invention.
Figure 6B:
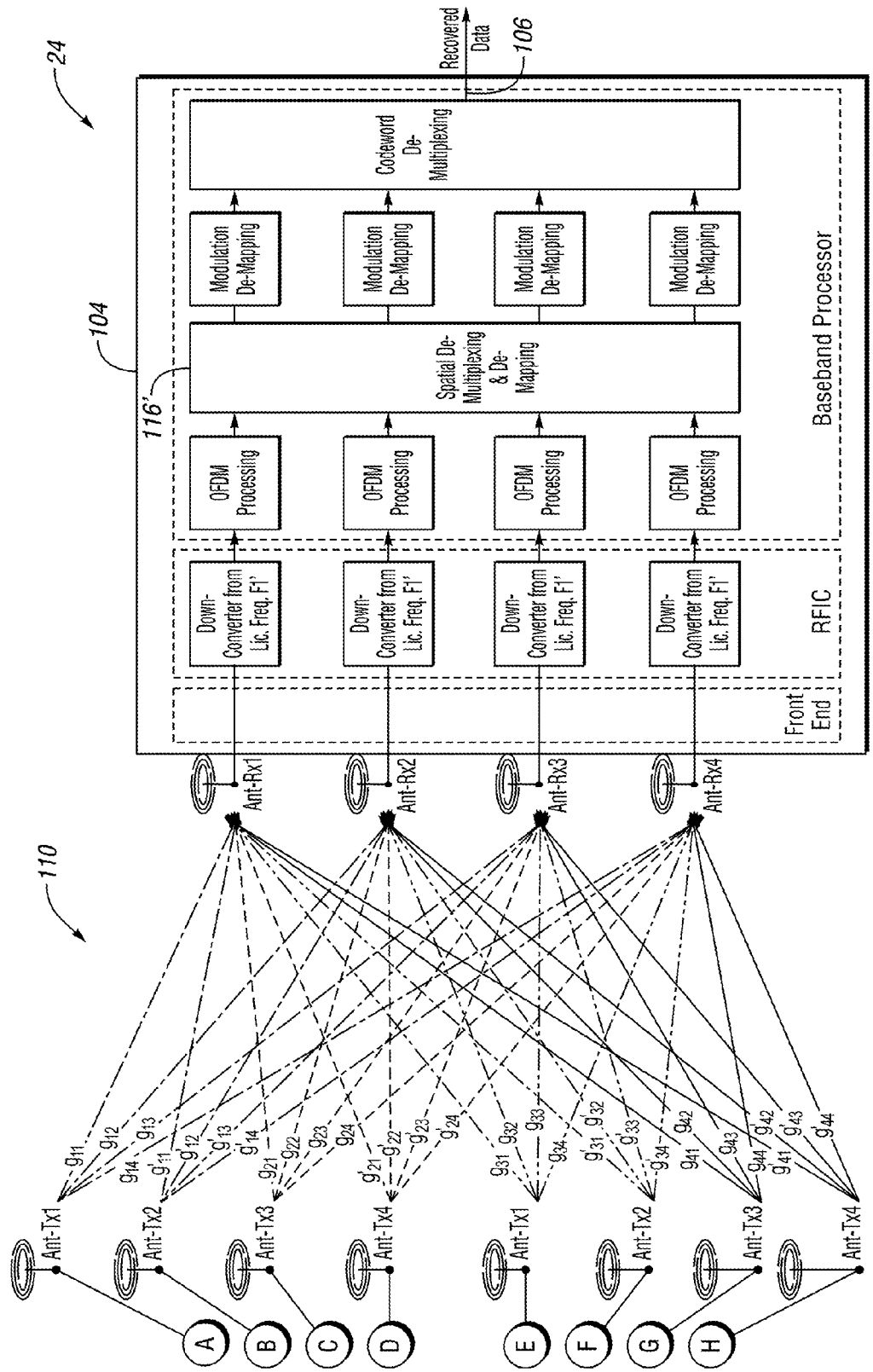

FIGS. 6a-6b schematically illustrates operation of the communication system 10 when facilitating wireless signaling having enhanced spatial diversity with beamforming in accordance with one non-limiting aspect of the present invention. The wireless signaling may be similar to the signaling described with respect to FIGS. 2, 4 and 5 at least in that the input signal 100 received at the first signal processor 12 is converted to an intermediary signal (combined into a single/common output to laser transmitter shown for exemplary purposes as having four equivalent parts—h11, h22, h33, h44) for transmission to the second signal processor 104 where it is then converted to the output signal 106. The illustration associated with FIG. 6 differs from that in FIG. 5 at least in that the intermediary signal traverses at least part of the distance between the first and second signal processors 12, 104 through the wireless medium 110 using beamforming. FIG. 6 illustrates a scenario where the intermediary signal received at each of the first and second end stations 40, 42 is replicated with beamformers such that duplicate signals are output to addition ports for use in transmitting four wireless signals. The additional wireless signals may be replicated with phase, delay or amplitude adjustments sufficient to facilitate beamforming. FIG. 6 describes signaling corresponding with a downstream direction for exemplary purposes as an equivalent but inverse set of components going in the uplink direction may be included to facilitate similar processes in a reverse or inverse order to facilitate upstream signaling.

Figure 7:
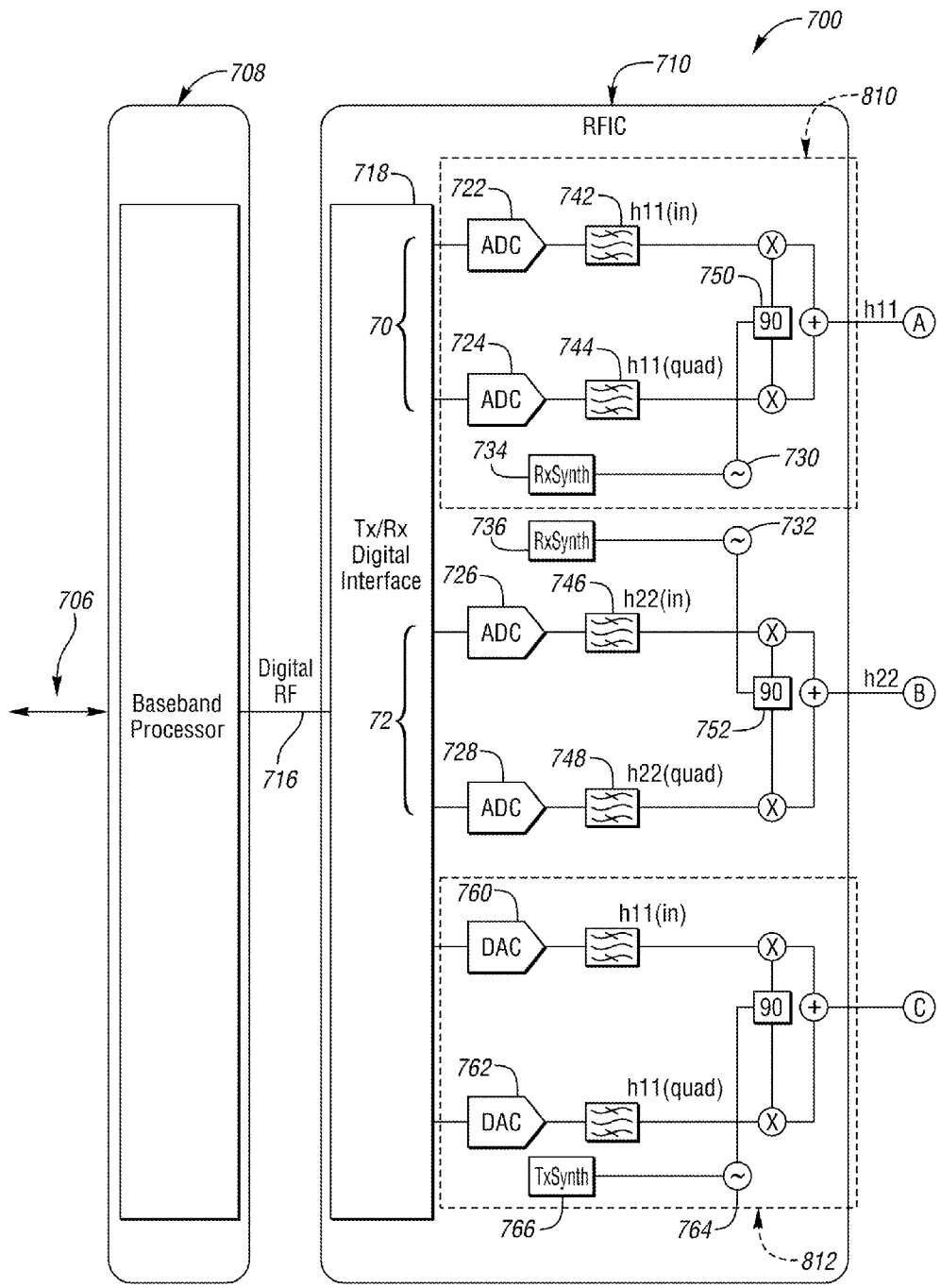
FIG. 7 illustrates a user equipment (UE) in accordance with one non-limiting aspect of the present invention.
Figure 7:
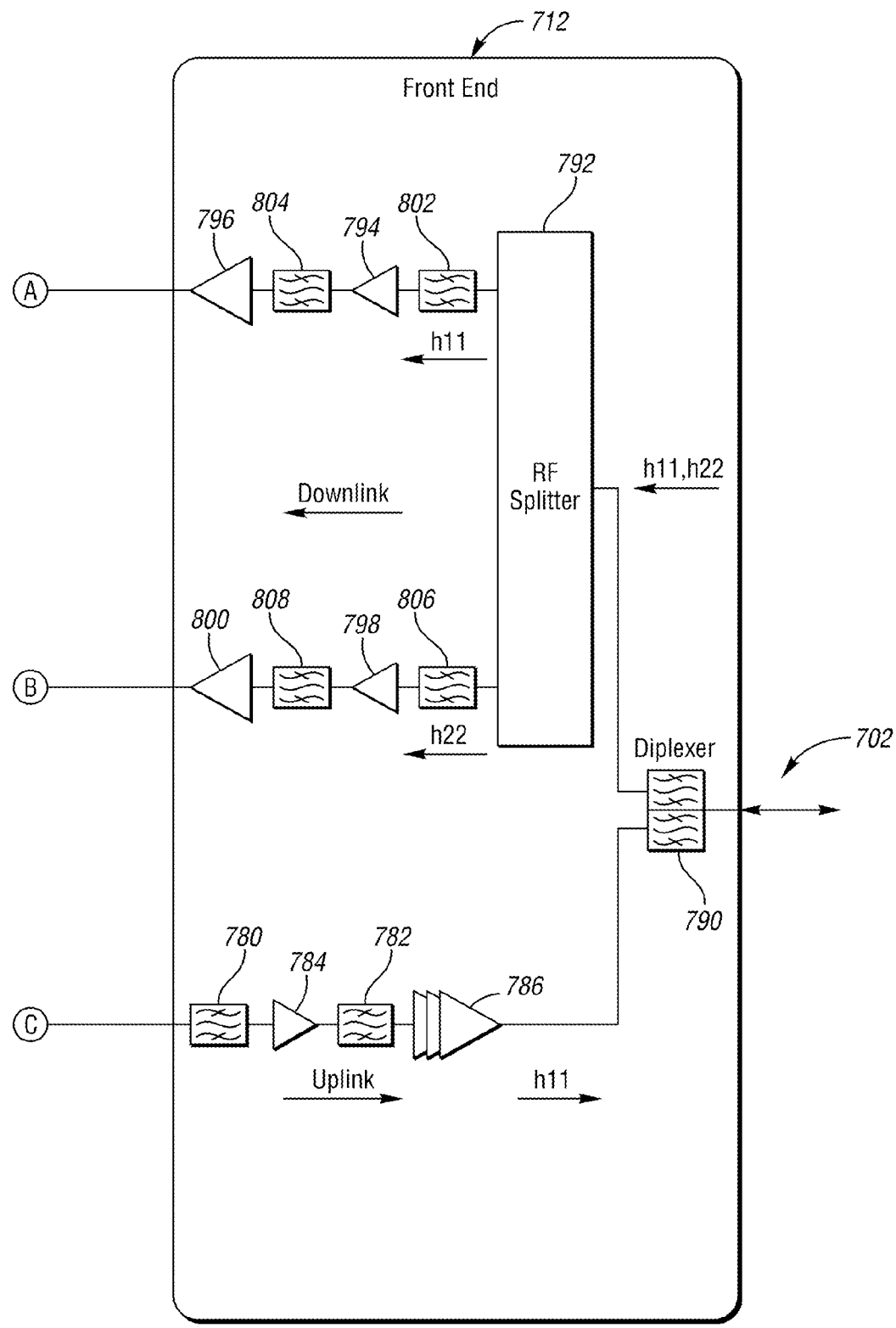

FIG. 7 illustrates a user equipment (UE) 700 in accordance with one non-limiting aspect of the present invention. The UE 700 may be considered as cable UE or other wireline UE configured to interface signals between the wired communication medium 34 and a user device, such as but not limited to the end station 22 shown in FIG. 1 (e.g., signal processor 48 in FIG. 2b). The UE 700 may be customer premise equipment (CPE), a modem, a settop box (STB), a television or virtually any other type of device configured to process signals transported in accordance with the present. These signals may be frequency-multiplexed signals that have been properly filtered so that they can be multiplexed on separate channels in the upstream and downstream spectrum. In the cable environment, the upstream and downstream frequency ranges may be split, e.g., the upstream may from 5 MHz to 42 MHz or 65 MHz, but it may be expanded to 85 MHz or 204 MHz or greater and the downstream frequency range may be 50 MHz to 1 GHz but could be expanded from 258 MHz to 1.2 GHz or 1.8 GHz, optionally following a plant upgrade. The UE 700 may be considered as a 2×2 MIMO signal processor at least in that a network-side exchanged signal 702 in both the uplink and downlink direction is shown to comprise a first signal (h11) and a second signal (h22) generated as function of one input signal (e.g., device-side bidirectional signal 706 when traveling in the uplink direction and signal 44, 100 when traveling in the downlink direction).

The UE 700 may include a plurality of components configured to facilitate processing signals for wireline exchange with the wired communication medium 34 and/or a device associated with the device-side signal 706. The components are shown for exemplary non-limiting purposes with respect to being arranged into three basic components: a baseband processor unit 708, a radio frequency integrated circuit (RFIC) 710 and a front end 712. The baseband processor 708 unit may be similar to the above described baseband processors and include various devices (e.g., the devices 52, 62, 64, 66, 68, 70, 72, 74, 76 and/or 116) to facilitate similar processing of uplink signaling and to facilitate equivalent, inverse processing for downlink signaling. The baseband processor unit 708 may be configured to consolidate downlink signaling traveling over individual data paths as a digitally modulated RF signal for output and to process uplink signaling for frequency modulation with the RFIC 710. Rather than having the baseband processor 708 in a different location than the RFIC 710 and the front end 712, one non-limiting aspect of the present invention contemplates having them co-located, optionally with a Joint Electron Device Engineering Council (JEDEC) specification (JESD207) interface 716 or an equivalent or otherwise sufficient interface as a connection piece to a transmit/receive (Tx/Rx) digital interface 718. The JESD207 interface 158 may eliminate the need for connecting the baseband processor using a fiber optic link for carrying the digitized RF therebetween.

At least in the downlink direction, the RFIC 710 may be the component that uses the digital data paths signals and directs them through an appropriate analog-to-digital (ADC) converter 722, 724, 726, 728 to be subsequently converted to desired frequencies. The RFIC 710 may be configured in accordance with the present invention to employ independent local oscillators (LO) 730, 732 and receive synthesizers 734, 736 for each path (h11, h22). The use of separate oscillators may be beneficial in allowing for multiple independently placed data paths at different frequencies to enhance frequency orthogonality, e.g., the data path output from the OFDM signal 70 may be converted from a frequency (F1) that is different from a frequency (F2) of the data path output from the OFDM signal 72. (An oscillator common to both paths (h11, h22), at least when connected in the illustrated manner, would be unable to generated the separate frequencies F1, F2.) Filters 742, 744, 746, 748 may be included for an in-phase portion (h11(in), h22(in)) and a quadrature portion (h11(quad), h22(quad)) to filter signals before transmission to the baseband processor 708, such as to facilitate removing noise, interferences or other signal components after the in-band and quadrature portions pass through RF mixers operating in cooperation with the oscillators 730, 732. Optionally, the filters 742, 744, 746, 748 may be tunable, e.g., according to the frequency of the signaling from the OFDM signals 70, 72 as the OFDM frequency may vary. The RFIC 710 may be configured with 90 degree phase shifters 750,752 to generate signals that are in-phase and in-quadrature to maximize total capacity. The phase shifters 750,752 receive the local oscillator signal as input and generate two local oscillator signal outputs that are 90 degrees out of phase.

The front end device 712 may be configured to aggregate and drive the signals h11 to the coaxial medium in the uplink direction and receive signals h11, h22 from the coaxial medium in the downlink direction. With the front end 712 connecting to the wired communication medium 34, the preset invention contemplates delivering/receiving signals from the UE 700 at relatively lower power levels than the signals would otherwise need to be delivered if being transmitted wirelessly. In particular, the contemplated cable implementation may employ amplifiers 188 (see FIG. 1) within the fiber and/or trunks to maintain the signaling power within certain levels, i.e., to amplify signaling output (h11, h22) from the RF distribution and combining network at relatively lower power levels and/or to ensure the signal power as emitted from the RF combining network remains approximately constant. The power level, for example, of a 20 MHz signal (h11, h22) output from the RF distribution and combining network to the optical transmitter may be approximately −25 dBm whereas similar wireless signaling outputted to an antenna, such as from a macro cell, may need to as high as, e.g., approximately 40 dBm. This contemplated capability of the present invention to leverage existing amplifiers and capabilities of existing HFC plants 34 may be employed to minimize the output signaling power requirements, and thereby improve design implications (i.e. lower gain) and provide lower implementation costs.

The UE 700 may be configured to process uplink signals from a device (not shown), which is shown for exemplary purposes as a signal h11, which may be different than the h11 signal transmitted on the downlink. The UE 700 is shown to support 2×2 MIMO on the downlink and 1×1, or SISO (or 1×1 MIMO), on the uplink for exemplary, non-limiting purposes as similar MIMO capabilities may be provided on the uplink. Digital-to-analog converters (DAC) 760, 762 may be used to generate the upstream RF signals and subsequently upconvert them such that the front end device 712 may be configured to aggregate and drive the signal h11 to the coaxial medium in the uplink direction. As opposed to the separate oscillators and synthesizers in the downlink, the uplink maybe configured to operate in a SISO (or 1×1 MIMO) configuration may include a single oscillator and synthesizer 764, 766 to facilitate commonly converting in-band portion h11 (in) and quadrature portion h11 (quad) generated with the interface 718 to the frequency desired for transport of the uplink signal h11 over the wired communication medium 34. In case of an uplink configuration of 2×2 MIMO or greater MIMO order in medium 34 which requires frequency diversity, multiple local oscillators may be used. The uplink signal (h11) may be processed with amplifiers 780, 782 and filters 784, 786. The amplifiers/filters 780, 782, 784, 786 may be controllable and/or tunable in order to facilitate proper signal recovery and to adjust amplification according to characteristics of a traversed portion of the wired communication medium 34. As multiple tunings may occur over time for the downstream signaling, the upstream tunings may be similarly dynamic. State information may be kept to track and control the specific tuning parameters and/or data or other information may be include in the received signaling to facilitate the desired tuning of the third and further amplifiers/filters.

A diplexer 790 may be included to facilitate splitting uplink and downlink signaling within the UE 702 to facilitate interfacing the network-side signal 702 with the wired communication medium 34. An RF splitter 792 may be configured to separate the downlink signal into two. Downlink amplifiers 794, 796, 798, 800 and/or filters 802, 804, 806, 808, may be controllable to facilitate processing the corresponding signaling at different power levels, e.g., the amplification of a first amplifier 794 may be different from a second amplifier 798 and the filters 802, 804, 806, 808 may be used to control passage of h11, h22 or other frequency selected frequency ranges. The amplification of the first and second amplifiers 794, 798, for example, may be set according to a signaling frequency and path being traversed as the signal travels from the signal processor 30 and/or remote antenna unit 40, 42. In the medium 34, the channel frequency used to carry signals h11 to the UE 700 may be more attenuated than the channel frequency carrying the signals h22, which may be compensated for with corresponding control of the amplifiers 802, 804. The ability to control the amplification on a per path basis may be beneficial in setting a slope of the corresponding signaling to account for losses, attenuation and/or other signaling characteristics of the corresponding path within the wired communication medium 34 so as to insure the signals are approximately flat when further processed by the UE 700. The amplifiers 794, 796, 798, 800 and/or filters 802, 804, 806, 808 may be controllable in order to facilitate downstream synchronization, elimination of sidelobes, unwanted adjacent channel energy and/or to compensate for signal distortions and/or other characteristics of the particular data paths to be traversed by the corresponding signaling.

The UE 700 is shown to include a plurality of components arranged into the baseband processor 708, the RFIC 710 and the front end 712. The components of the baseband processor 708 utilized for uplink signaling may be similar to those described above in FIGS. 2, 4 and 5 and those utilized for downlink signaling may be equivalent inverses to those described above in FIGS. 2, 4 and 5. These components, however, are shown for illustrative purposes as the baseband processor may include other components and arrangements of the components in order to facilitate operations contemplated herein. The RFIC 710 includes components configured to facilitate converting received and transmitted signals to desired frequencies, such as with an upconversion or downconversion. The operation of the RFIC 710 may cooperate with the upstream signal processor 30 to facilitate adjusting frequency orthogonality and performing other frequency adjustments necessary to convert the frequency divers, downlink signals 702 transmitted therefrom and to facilitate modulating baseband or other input signals received from the baseband processor 708 uplink transmission. The RFIC 710 may be considered as a frequency converting device having one or more downlink frequency conversion units 810 and one or more uplink frequency conversion units 812.

The uplink and downlink frequency conversion units 810, 812 may be generally similar insofar as each includes an oscillator, synthesizer and phase shifter operable with ADCs or DACs, filters and/or RF mixers whereby each are independently controllable. The individual controllability of the components may be beneficial in enabling converting non-frequency diverse signaling to frequency diverse signal transmissions and processing of frequency diverse signaling to non-frequency diverse signaling, such as to to facilitate processing in-band and quadrature band portions of transported signaling in order to facilitate the frequency operations contemplated herein. The uplink and downlink frequency conversion units 810, 812, may be considered for exemplary purposes as modular type components at least in so far as additional units can be added essentially as modules to one or both of the uplink and downlink paths in order to facilitate additional signal processing, such as to enable 4×4 MIMO, etc. The number of uplink and downlink frequency conversion units 810, 812 included within the RFIC 710 may be based on the number of inputs and outputs of the front end 712, i.e. one downlink frequency conversion unit 810 may be required for each output of the front end 712 to the RFIC 710 and one uplink frequency conversion unit 812 may be required for each input from the RFIC 710 to the front end 712.

The front end 712 may be configured to facilitate interfacing the network-side signaling 702 (uplink and downlink signaling) with the wired network 34 or other connected to network (interfacing to wireless networks is described below). The front end 712 may be configured with capabilities sufficient to enable separation, filtering, amplification and other adjustments to each signal part transmitted from the signal processor 30 (downlink signaling) and similar capabilities to facilitate driving signaling to the wired communication medium 34 (uplink signaling). The amplifiers, filters and/or other components may be individually controllable to facilitate desired processing of the uplink and downlink signaling, similarly to the baseband processor 708 and the RFIC 710, such as based on MAP transmission information or other data carried over the wired network and/or other instructions provided thereto in the described in U.S. patent application Ser. No. 12/954,079, entitled Method and System Operable to Facilitate Signal Transport Over a Network, the disclosure of which is hereby Incorporated by reference in its entirety. The UE 700 may be configured to sniff location and other pertinent information to calculate antenna illumination parameters or other included instruction sufficient to facilitate signal processing. The ability to individually process uplink and downlink signaling paths at the front end 712 may be beneficial in enabling signaling a standard or common front end 712 to be deployed throughout the system 10 and thereafter be individually adjusted to compensate for noise, attenuation and other signaling path characteristics of a corresponding portion of the system 10, e.g., the front end 712 at end station 22 may be controlled differently than the front end 712 at another location due to signal characteristics of the corresponding portions of the wired communication medium 34 at each location.

Figure 8:
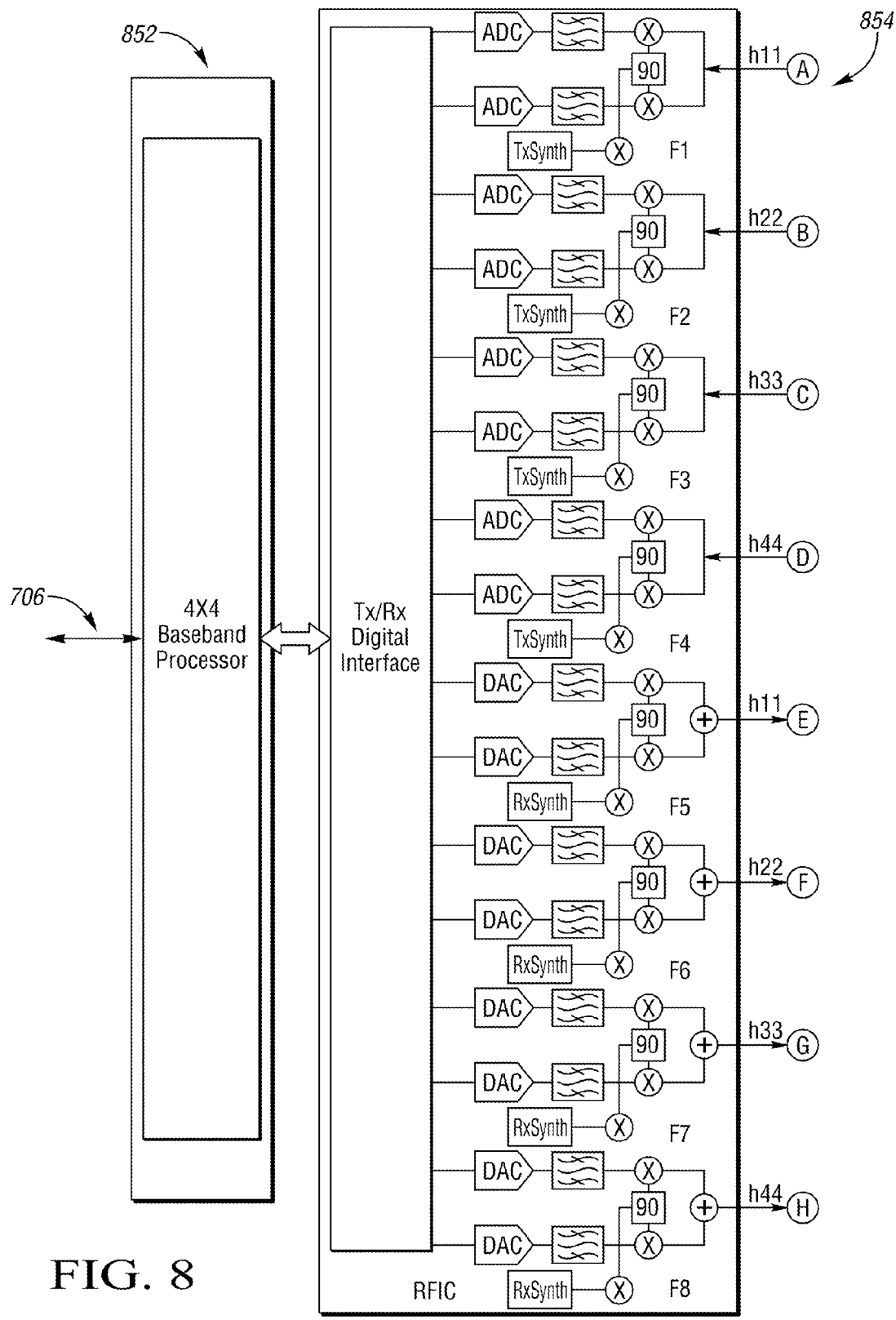
FIG. 8 illustrates a user equipment (UE) in accordance with one non-limiting aspect of the present invention.
Figure 8:
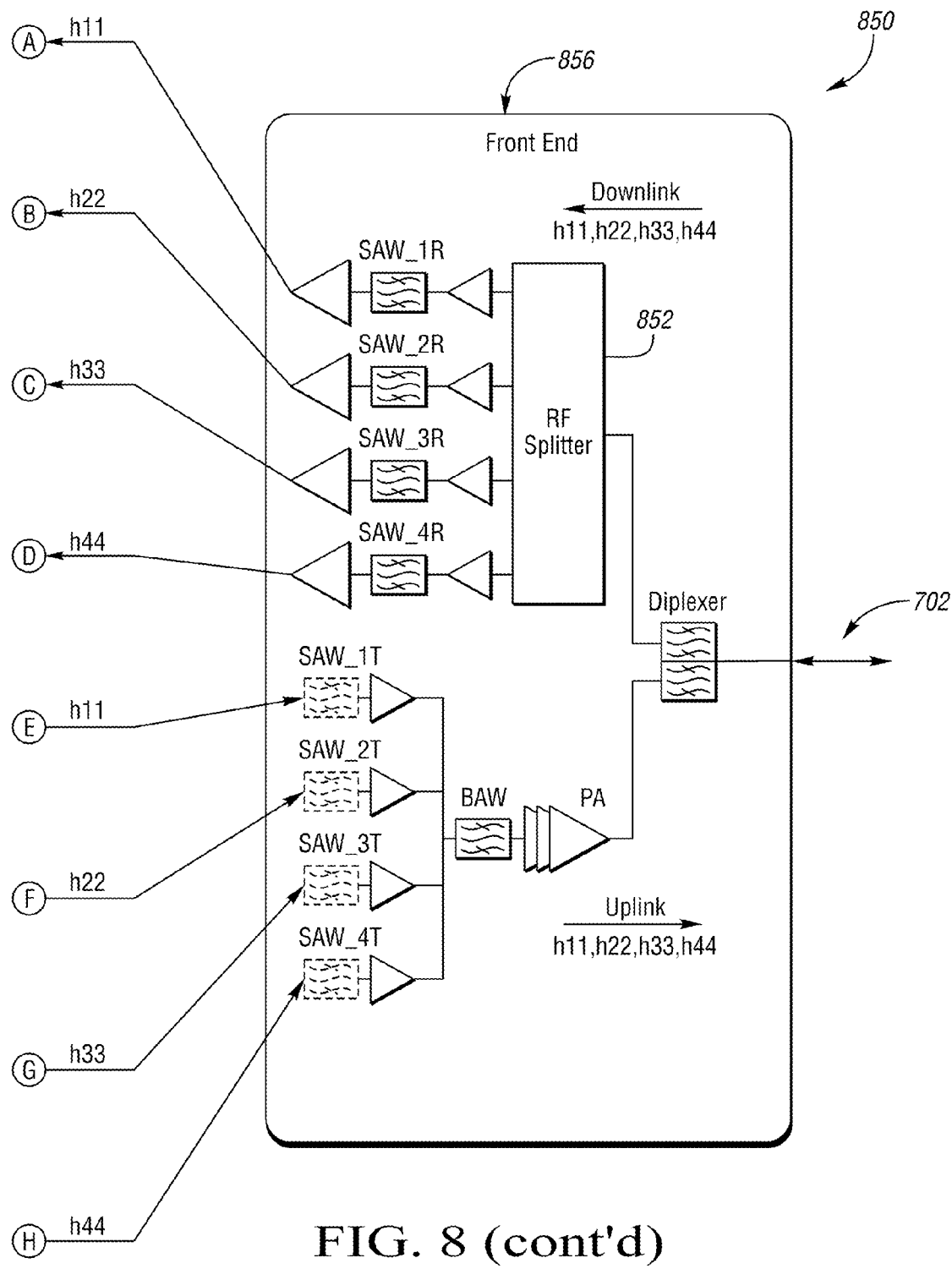

FIG. 8 illustrates a 4×4 MIMO, wireline UE 850 in accordance with one non-limiting aspect of the present invention. The UE 850 may be considered as a 4×4, MIMO signal processor at least in that singular signals input to and output from the baseband processor may be processed into a first signal (h11), a second signal (h22), a third signal (h33) and a fourth signal (h44) during uplink and downlink transport over the wire communication medium 34 (e.g., signal processor 48 in FIG. 2b). The signal processor 850 may be configured similarly to the signaling processor 150 shown in FIG. 7, particularly with respect to the use of amplifiers, filters, combiners, digital and analog converters and oscillators/synthesizers (reference numerals have been omitted however the operation of the components may be controlled in the manner described above and the associated operation may be understood according to the corresponding circuit designation known to those skilled in the art). The signal processor 850 may be similarly configured with a baseband processor 852, an RFIC 854 and a front end 856. The baseband processor may be similar to the baseband processor 708 and the RFIC 854 may be similar to the RFIC 710 with the exception of including additional uplink and downlink conversion units 810, 812 to facilitate frequency processing of additional uplink and downlink channels. The corresponding uplink and downlink conversion units are references as F1, F2, F3, F4, F5, F6, F7 and F8 where each includes independently controllable oscillators and related components operation in the manner described above.

The front end 856 may be similarly configured to the front end 712 with additional filters, amplifiers, etc. to facilitate processing of the additional uplink and downlink signaling. The front end 856 is shown to include such components to facilitate four downlink outputs to the RFIC and four uplink inputs from the RFIC 854, one for each of the uplink and downlink signals h11, h22, h33 and h44. An RF splitter 852 may be included in the downlink to facilitate separating incoming (downstream) signaling into the equivalent parts h11, h22, h33, h44. (Note that unlike FIG. 7 that shows a SISO configuration in uplink, this example shows a 4×4 MIMO in the uplink.) The RFIC 856 is shown to be configured to facilitate interfacing the network-side signaling 702 and the device-side signaling 706 described above. The UE 850 may optionally be used in place of the UE 700 within the network to facilitate the 2×2 MIMO downlink and SISO uplink signaling associated with the UE 700, i.e., the UE 850 may be a replacement for the UE 700. Of course, corresponding controls may be implemented to facilitate turning "off" unused portions of the UE 850 if used in that manner and/or the unused portions may be re-used to support additional signal processing, such as to double or otherwise facilitate simultaneously processing signaling as if it were operating as the UE 700.

Figure 9:
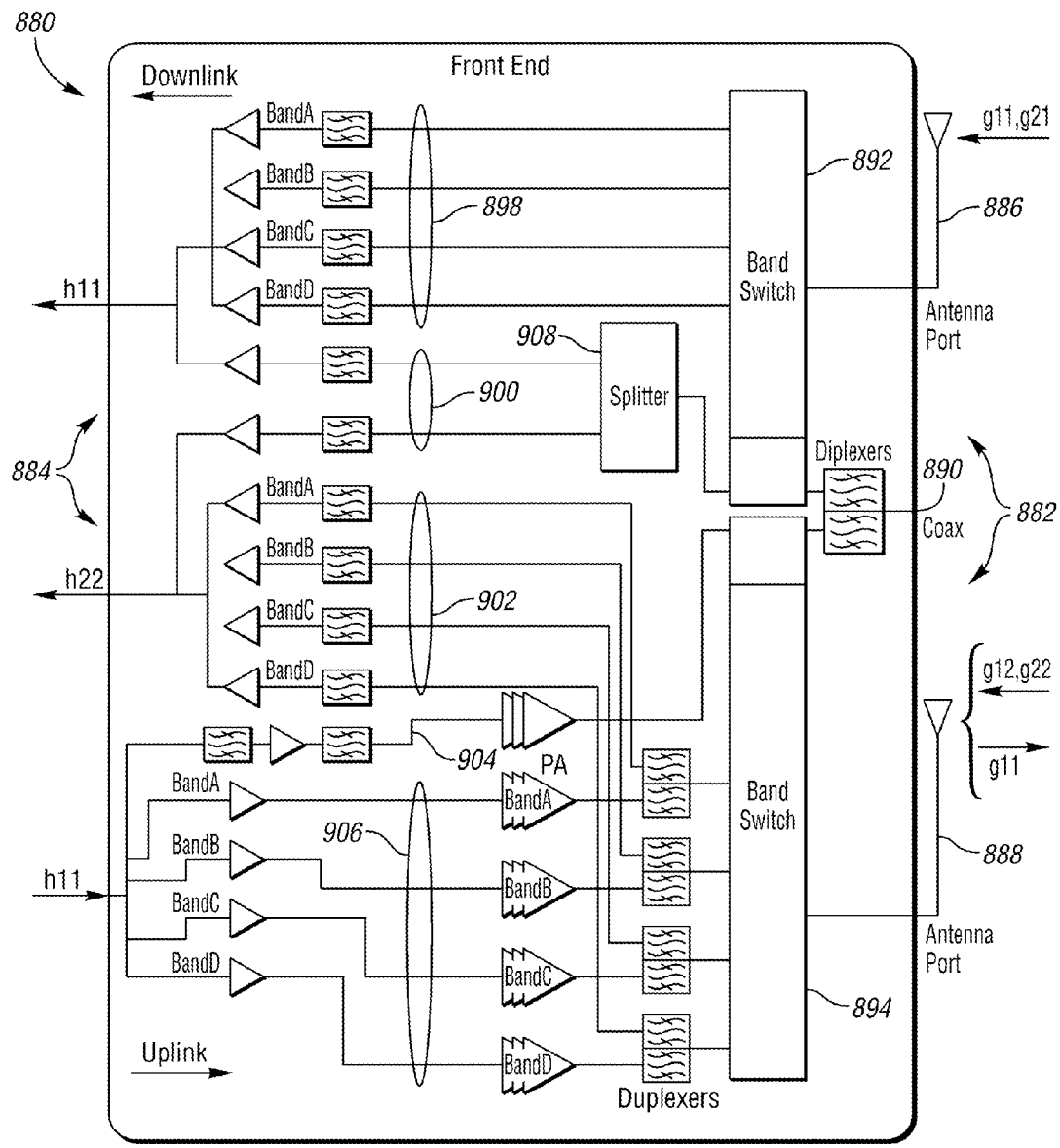
FIG. 9 illustrates a user equipment (UE) in accordance with one non-limiting aspect of the present invention.

FIG. 9 illustrates a universal front end 880 in accordance with one non-limiting aspect of the present invention. The front end 880 may be considered as universal due to an ability to process wireline and/or wireless network-side signaling 882 for interfacing with RFIC-side signaling 884. The illustrated configuration of the front end 880 is shown as configured to facilitate interfacing RFIC-side signaling 884 with the RFIC 710 illustrated in FIG. 7, i.e., two downlink outputs to the RFIC 710 and one uplink input from the RFIC 710. The front end 880 is shown to include a first antenna port 886 and a second antenna port 888 configured to facilitate exchanging network-side wireless signaling 882 and a coax or other wired interface 890 configured to exchange network-side wireline signaling 882. In this configuration, the front end 880 may be use in cooperation with the above-described baseband processors and RFICs to facilitate interfacing wireless signaling with one of the wireless end stations and wireline signaling with one of the wired end stations. The front end 880 is shown to include a plurality of amplifiers and filters to facilitate adjusting gain and frequency filtering for a plurality of frequency bands A, B, C, D. The frequency bands A, B, C, D may correspond with license wireless spectrum (see FIG. 3) over which wireless signaling may be exchanged with the front end 880.

The multiple frequency bands A, B, C, D are shown for example a non-limiting purposes to demonstrate one aspect of the front end 880 having capabilities sufficient to facilitate exchanging wireless signaling at various frequency bands. The frequency bands A, B, C, D may occupy frequencies other than those associated with the wired communication medium 34 but the frequency bands need not be different. First and second band switches 892, 894 may be included to facilitate directing signaling at particular frequencies to various signal pass within the front end 880 and/or to allow for the integration of wireless/wireline switching. As shown, a first plurality of downlink paths 898 may be used to facilitate processing and communicating downlink wireless signaling to the RFIC from the first and second antenna ports 886, 888, a second plurality of downlink paths 900 may be used to facilitate processing and communicating downlink wireline signaling to the RFIC, and uplink paths 904 may be used to facilitate processing and communicating uplink wireline signaling to the interface 890 and a plurality of uplink signaling paths 906 may be used to facilitate processing computer dictating uplink wireless signaling to the second antenna port 898. A splitter 908 may be included to facilitate separating the downlink wireline signaling, e.g., separating each part of the wireline signaling into separate signals four output to the RFIC (h11, h22). The amplifiers and filters and the band switches 892, 894 may be independently and separately controllable to facilitate directing signals to certain portions of the front end 888 according to frequency and/or a direction of travel and the corresponding amplifiers and filters may be similarly controlled to facilitate processing signaling according to the medium being traversed, such as in the manner described above.

The wireline signals being exchanged through the interface 890 may correspond with those associated with facilitating wireline signaling according to the manner described in FIG. 2. The wireless signals being exchanged through the first and second antenna ports 886, 888 may correspond with those associated with facilitating wireless signaling according to the manner described in FIGS. 4, 5 and 6. The illustrated wireless signaling corresponds with 2×2 MIMO signaling where two antenna ports transmit downlink wireless signals to the front end 880 from separate antenna ports, e.g., two ports included on one of the end stations (remote antenna units) 40, 42 or separate ports included on each of the end stations 40, 42. As described above, the wireless signaling may be transmitted such that single signal part (e.g. h11) is transmitted from a signal antenna port and effective received at both of the first and second antenna ports 886, 888 (e.g., g11 is received at the first port 886 and g12 is received at the second port). In a 2×2 downlink MIMO, h11=g11+g21 and in a 4×4 downlink MIMO, h11=g11+g21+g31+g41. Similarly, in a 2×2 downlink MIMO, h22=g12+g22 and in a 4×4 downlink MIMO, h22=g12+g22+g32+g42. The front end 880 may be configured to facilitate processing the downlink wireless signals (g11, etc.) for processing to the RFIC, including similar processing for facilitating wireless signaling having beamforming, e.g., processing of g'11, g'22, etc. The front end 880 may also facilitate uplink wireless signaling, which is shown as SISO due to only the second antenna port 888 being used for uplink wireless signaling.

Figure 10:
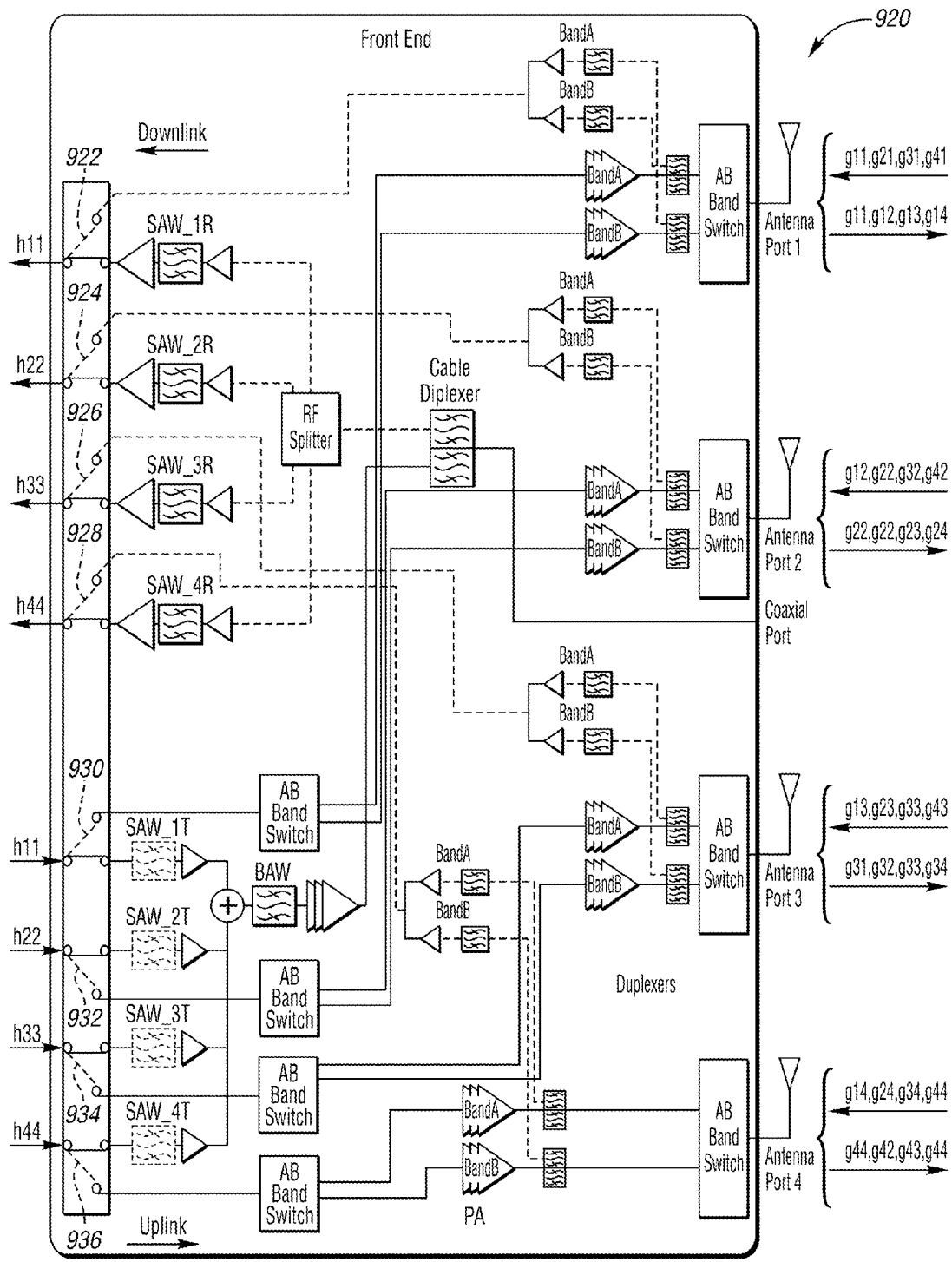
FIG. 10 illustrates a user equipment (UE) in accordance with one non-limiting aspect of the present invention.

FIG. 10 illustrates a universal, 4×4 MIMO front end 920 in accordance with one non-limiting aspect of the present invention. The front end 920 may operate similarly to the front end 880 at least in so far as supporting multiple frequency bands (A, B) for wireless signaling and any frequency band for wireline signaling using the above described band switches, amplifiers, filters, etc. The front end 920 may be configured to facilitate interfacing signaling with the RFIC 854 show in FIG. 8 due to the four uplink and downlink input and output ports associated therewith. The front end 920 is shown to be configured to facilitate dual-band wireless signal in order to facilitate use with more limited UEs, i.e., those only required or enable to support two bands. Unlike the front end 880, the front end 920 may support 4×4, wireless uplink signaling over four antenna ports (the effective wireless signaling (g11, etc.) are illustrated for the corresponding uplink and downlink wireless signaling with respective arrows). The front end 920 is shown to include a plurality of individually controllable switches 922, 924, 926, 928, 930, 932, 934, 936 to facilitate selectively directing wireless and wireline signaling between the appropriate on of the antenna ports (labeled ports 1, 2, 3, 4) and the coaxial or wired port (labeled).

Figure 11:
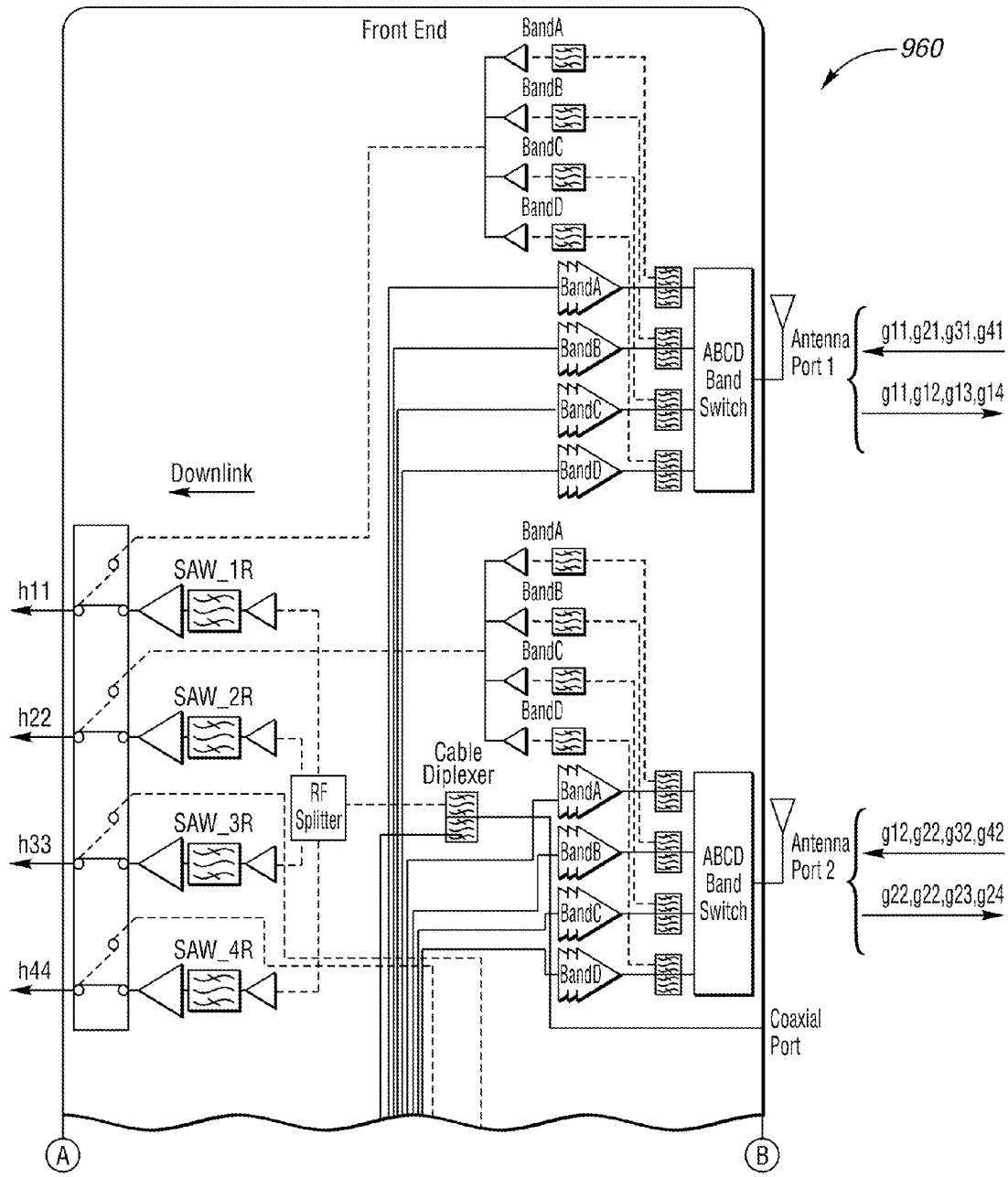
FIG. 11 illustrates a user equipment (UE) in accordance with one non-limiting aspect of the present invention.
Figure 11:
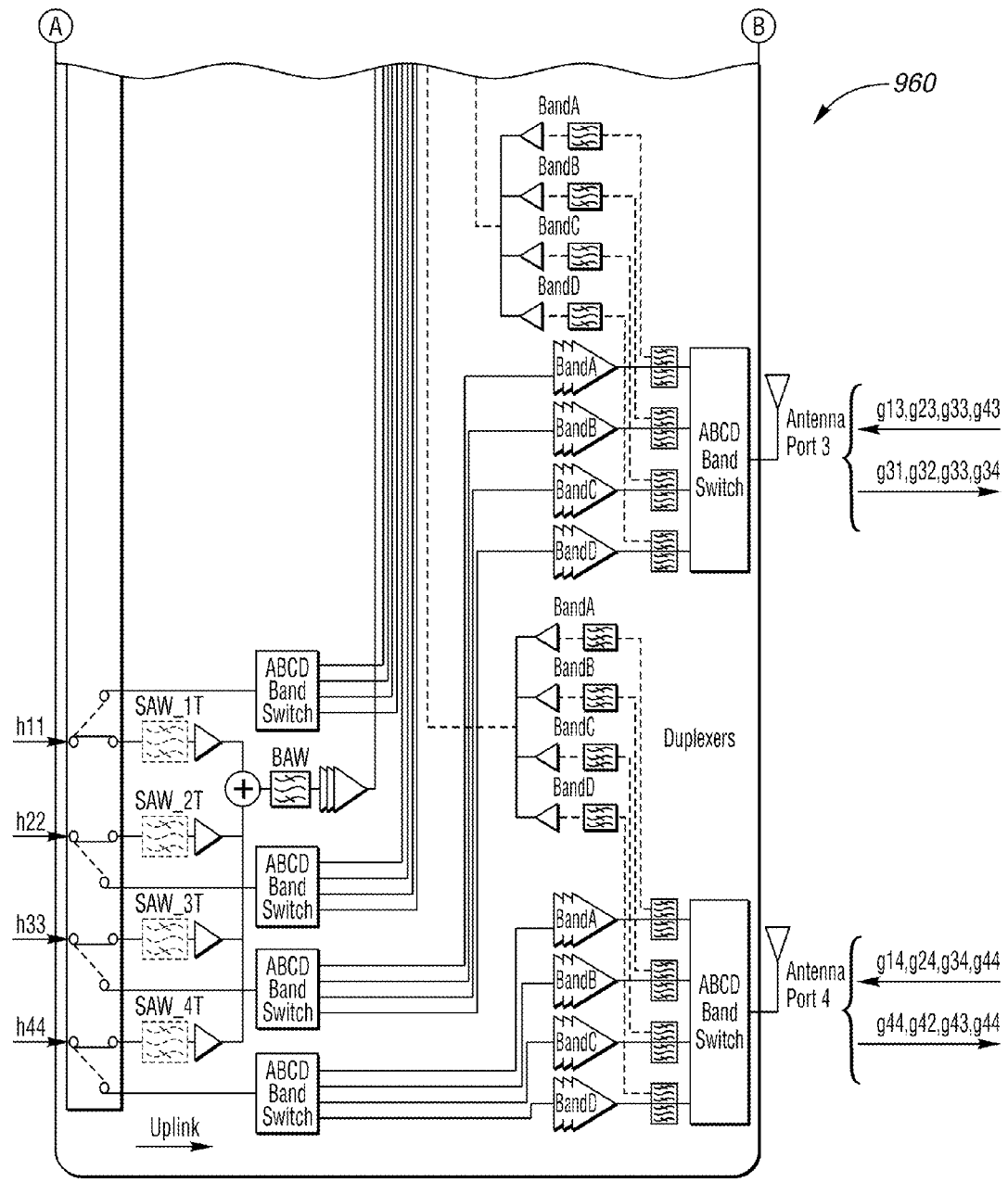

FIG. 11 illustrates a universal, 4×4 MIMO front end 960 in accordance with one non-limiting aspect of the present invention. The front end 960 is similar to the front end 920 and shown to include additional components to facilitate four-band (A, B, C, D) wireless signaling. The front end 960 may be universal and so far is including capabilities sufficient to facilitate wireline and/or wireless receipt of signal parts (h11, h22, h33, h44) transmitted directly thereto from the signal processor 30 and/or wirelessly thereto from one of the remote antenna units (the signal parts h11, h22, h33, h44 may be effective received that each of the antenna ports (signals g11, g12, etc.). As with the front end 920, the front end 960 may be operable as a wireless-only device, such as is so wireline are removed and/or the corresponding switches are driven to facilitate the connections only associated with wireless signaling paths. Optionally, the front end 920 and the front end 960 may have the wireline signaling paths and related components removed in order to be configured as a dedicated wireless front end.

Figure 12:
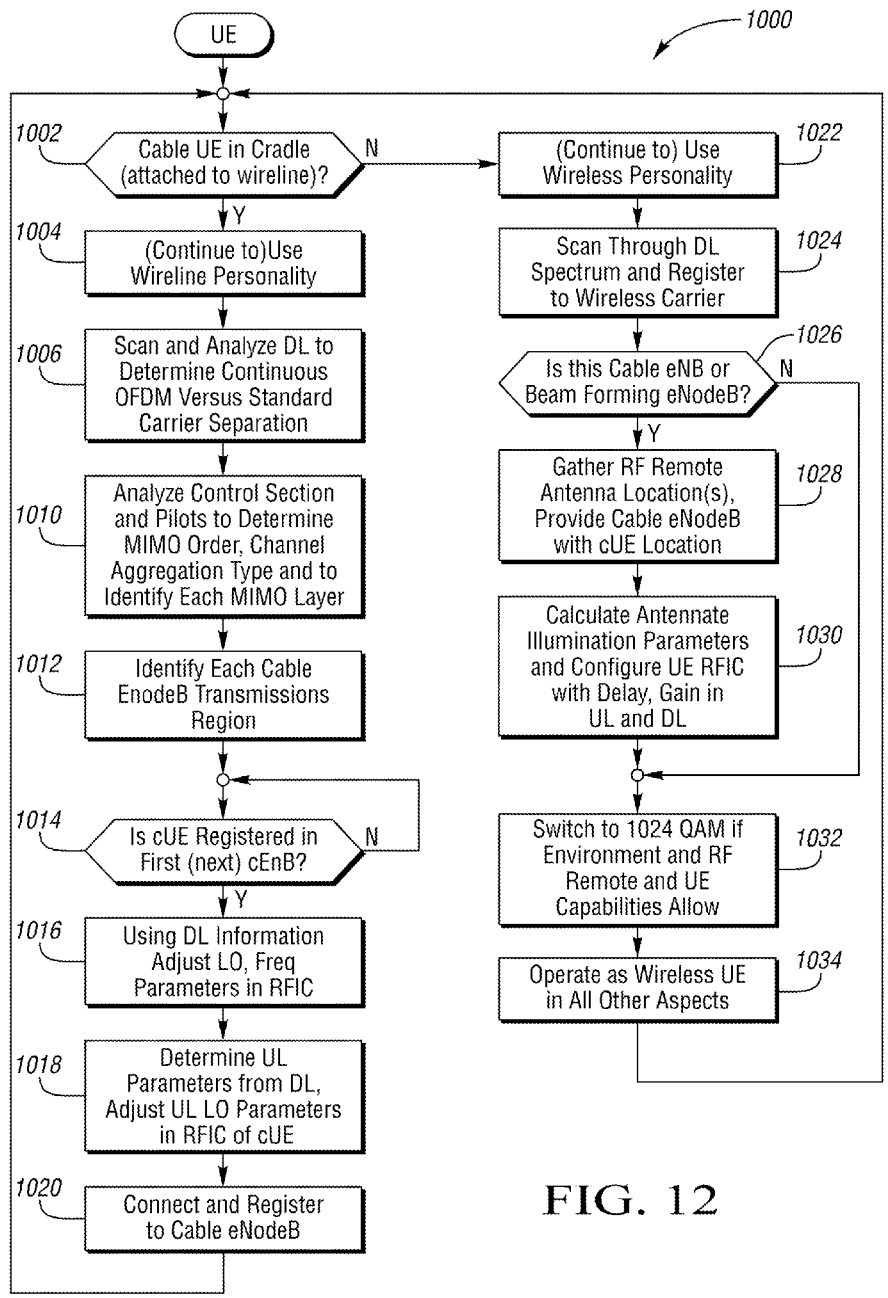
FIG. 12 illustrates a flowchart of a method for controlling a user equipment (UE) in accordance with one non-limiting aspect of the present invention.

FIG. 12 illustrates a flowchart of a method for controlling a UE to facilitate signaling in accordance with one non-limiting aspect of the present invention. The method may be embodied in a non-transitory computer-readable medium, computer program product or other construct having computer-readable instructions, code, software, logic and the like. The instructions may be operable with a processor or other logically executing device of the UE and/or another one or more of the devices/components described herein to facilitate controlling the signaling processing and/or the other devices/components in the manner contemplated by the present invention to facilitate delivering wireless signaling. The method is predominately described for exemplary non-limiting purpose with respect to at least a portion of the wireless signaling, or corresponding intermediary signaling, being long-hauled carried over a wired and/or wireline communication medium, such as but not necessarily limited to cable or hybrid-fiber coax (hfc) network. The long-haul or intermediary signaling may be facilitated with processing or other controls performed with the UE sufficient to provide wired transport over a greater distance than the eventual wireless signaling transport, thereby leverage off of the economies associated with wired transport while also facilitating final interaction with wireless devices.

Block 1002 relates to determining whether the UE, noted as a cable UE (cUE), is connected to the wired communication medium 34 or the wireless communication medium 110. The connection may be determined based on whether the UE is within a cradle, a docking-station or another removable receptacle (not shown) having an interface to the wired communication medium 34 as one non-limiting aspect of the present invention contemplates the UE having capabilities to automatically switch between a wireline and wireless personality based on location, connection or use. Block 1004 relates to determining the wireline personality, i.e., the UE being optimized or having capabilities sufficient to facilitate wireline signaling. In the event the UE is a mobile phone or other predominately wireless device, use of the wireline personality may be beneficial in enabling wireline communications with the UE over the system without having to convert back to wireless signaling, e.g., the wireless signals associated with a phone call may be received and transported over the system 10 to the recipient UE without having to be converted back to the wireless signals or spectrum licensed to the recipient UE. Of course, the present invention is not limited to this use case and fully contemplates desiring the wireline personality for various reasons, such as to enable disablement of the wireless signaling related components to save UE energy life, reduce costs of wireless charges from wireless operator and/or to free the wireless signaling related components for use in processing other wireless signaling that the UE would otherwise not be able to process or to process simultaneously.

Block 1006 relates to the UE scanning and analyzing the downlink (DL) signaling, MAP information and other signaling being carried over the wired communication medium 34 to facilities automatically controlling, programming or otherwise implementing state for the various controllable UE components described above. The scanning and analysis may include determining whether continuous OFDM versus standard carrier separation is being used to facilitate wireline signaling with the UE (optionally including uplink and downlink). Block 1010 to analyzing control section and pilots to determine MIMO order, channel aggregation type and to identify each MIMO layer, such as to determine whether 2×2, 4×4 or other MIMO orders are to be employed. Block 1012 relates to identifying each cable eNodeB (e.g., signal processor 30) transmission region in the event the UE is reachable by multiple eNodeBs and/or if a single processor 30 effectively constructs multiple eNodeBs to service the system 10. Block 1014 relates to determining whether cUE registered in first (next) eNodeB or another, such as to determine whether the parameters and other information collected in the preceding blocks are intended for its use or whether such information should be continued to be processed until more relevant information is determined. Block 1016 relates to using DL information to adjust local oscillator (LO) frequency parameters and/or other parameters (amplifier settings, band switching, etc.) in the RFIC. The frequency parameters may be individually adjusted for each uplink and/or downlink frequency conversion unit operable within the UE and/or the one or more units tasked with facilitating the specified wireline signaling.

Block 1018 relates to determining UL parameters (LO frequency, amplifier settings, band switching, etc.) from DL information and facilitating corresponding adjustments, such as by adjusting UL LO parameters in the RFIC. Block 1020 relates to connecting and registering with a eNodeB (e.g, signal processor 30). The UE may notify the registered eNodeB of a capability to facilitate receiving wireline signaling and/or a capability to facilitate transmitting wireline signaling thereto, e.g., to indicate acceptance of parameters necessary to facilitate uplink and downlink directed signaling associated with facilitate the phone call. Block 1002 may be returned to following the registration in order to re-assess whether additional wireless and/or wireline signaling is desired and/or whether the UE has been removed from the cradle or otherwise switch to a wireless personality, such as in the event a user switches a setting. Block 1022 relates to determining a wireless personality, i.e., the UE being optimized or having capabilities sufficient to facilitate wireless signaling. In the event the UE is a mobile phone or other predominately wireless device, use of the wireless personality may be beneficial in enabling wireless communications with the UE following transmission of at least a portion of the signals as wireline signals.

Block 1024 relates to scanning through DL spectrum and registering for wireless signaling, such as by performing a handshake or other operation with a wireless end station to gain access to the corresponding wireless communication medium and to announce presence and availability for wireless signaling. Block 1026 relates to determining whether the eNodeB tasked with supporting signaling thereto intends to rely upon an end station having beamforming capabilities to facilitate the wireless signaling with the UE. Block 1028 relates to determining beamforming to be enabled and gathering RF remote antenna location(s) and providing the eNodeB with a location of the UE. The location information may be used to determine one or more remote antenna suitable to facilitate wireless signaling with the UD, such as to spatially distant remote antenna units suitable to providing enhanced MIMO. Block 1030 relates to calculating antenna illumination parameters and configuring the UE RFIC with delay, gain and UL/DL communication parameters, i.e., setting the various controllable states of the RFIC components to facilitate beamforming signaling. Block 1032 relates to switching to 1024 QAM if environment in RF remote in unique capabilities allow. Block 1034 relates to operating UE to facilitate the contemplated wireless signaling.

As supported non-limiting aspect of the present invention relates to a cable UE configured to implement data transport with the flexibility to place each data path generated for MIMO into independent frequency channels to maintain orthogonality among data paths while in the coaxial cable medium. The UE may include a baseband processor unit remaining the same as its wireless counterpart or it may have support for higher modulation orders and shorter cyclic prefix lengths, leveraging the more benign environment of the HFC network. In the RFIC, frequency independence for the different data paths may be achieved by adding a separate independent local oscillator and frequency synthesizer. To support higher order modulations intended in the wireline environment, ADC and DAC components with higher number of bits per sample may be used. In the cable implementation (Cable UE), no antennas may be needed, only modest amplification in addition to uplink combining and downlink signal distribution is needed. A diplexer may be used to separate downlink from uplink data paths. Flexibility of independent frequency selection of data paths can also be leveraged to incorporate carrier aggregation.

One non-limiting aspect of the present invention relates to a Wireline/Wireless Universal UE (FIGS. 9-11). This UE/cable UE dual function implementation enables the use of the same end device for wireless and wireline purposes. An example use case leveraging this implementation is an LTE wireless handset that becomes a wireline modem (cUE) when it is placed in a cradle connected to the wireline network. This implementation uses the same "Universal" RFIC depicted in FIG. 7 and uses a modified front end that still has significant similarity to the front end depicted for the traditional wireless implementation shown in FIG. 7. The front end in FIG. 9 has some additional switching paths in addition to the downstream and upstream wireline data paths that connect to the RFIC. The power amplifier depicted in the wireline path requires less gain than the wireless amplifiers because the HFC network is already an amplified network. Since LTE has optimized handoff mechanisms for switching from one band to another. This "Universal UE" leverages these handoff mechanisms for switching between wireless and wireline While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A multiple-input multiple-output (MIMO) user equipment (UE) comprising:
   a front end configured to process at least a first signal part, a second signal part, a third signal part and a fourth signal part;
   a radio frequency integrated circuit (RFIC) configured to convert the first signal part at a first frequency, the second signal part at a second frequency, the third signal part at a third frequency and the fourth signal part at a fourth frequency to a common fifth frequency;
   a baseband processor configured to combine the first, second, third and fourth signal parts into an output signal;
   wherein the front end includes a wired interface for receiving the first, second, third and fourth signal parts as frequency diverse signals when carried over a wired communication medium;
   wherein the front end includes a plurality of wireless ports, including a first port, a second port, a third port and a fourth port for receiving the first, second, third and fourth signal parts as spatially diverse signals when carried over a wireless communication medium; and
   wherein the front end includes one or more switches operable to switch signal paths through the front end from wireline paths to wireless paths depending on whether the first, second, third and fourth signal parts are received at the wired interface or the wireless ports.

2. The UE of claim 1 wherein the switches are automatically operable to switch to the wireline paths when connection to a cradle is determined and to switch to the wireless paths when connection to cradle is not determined.

3. The UE of claim 1 wherein the front end includes an output to the RFIC for each of the first, second, third and fourth signal parts.

4. The UE of claim 3 wherein the RFIC includes a frequency conversion unit for each of the outputs, each of the frequency conversion units including an independently controllable local oscillator to facilitate frequency conversion of the first, second, third and fourth signal parts to the fifth frequency.

5. A multiple-input multiple-output (MIMO) user equipment (UE) operable with a hybrid fiber coaxial (HFC) network to facilitate wireless and wireline signaling, the UE comprising:
   a front end having a wireline interface for interfacing wireline signals with the HFC network and a wireless interface for interfacing wireless signals with the HFC network, the front end including wireless and wireline signal paths for the interfaced wireless and wireline signals;
   a radio frequency integrated circuit (RFIC) configured to generated frequency converted signals for the wireline and wireless signal paths;
   a baseband processor configured to interface the frequency converted signals with a device connected thereto;
   wherein the wireless interface includes a plurality of wireless ports; and
   wherein the front end includes a frequency band switch for each of the wireless ports, each frequency band switch being operable between at least a first and second frequency band to facilitate interfacing wireless signals within the corresponding frequency band.

6. A multiple-input multiple-output (MIMO) user equipment (UE) operable with a hybrid fiber coaxial (HFC) network to facilitate wireless and wireline signaling, the UE comprising:
   a front end having a wireline interface for interfacing wireline signals with the HFC network and a wireless interface for interfacing wireless signals with the HFC network, the front end including wireless and wireline signal paths for the interfaced wireless and wireline signals;
   a radio frequency integrated circuit (RFIC) configured to generated frequency converted signals for the wireline and wireless signal paths;
   a baseband processor configured to interface the frequency converted signals with a device connected thereto;
   wherein the front end includes at least one uplink port and at least one downlink port for respectively interfacing uplink and downlink signals traversing the wireline and wireless signaling paths; and
   wherein the font end includes a switch associated with each uplink port and each downlink port, the switches operable between a wireless position and a wireline position, the wireless position connecting the corresponding one of the uplink and downlink ports to one of the wireless paths and the wireline position connecting the corresponding one of the uplink and downlink ports to one of the wireline paths.

7. The UE of claim 6 wherein the front end is operable to automatically set the switches to the wireline position when connection to a cradle is determine and to automatically set the switches to the wireless position when connection to the cradle is not determined.

8. The UE of claim 6 wherein the RFIC includes a frequency conversion unit for each of the ports, each of the frequency conversion units including an independently controllable local oscillator to facilitate frequency conversion.

9. A multiple-input multiple-output (MIMO) user equipment (UE) operable with a hybrid fiber coaxial (HFC) network to facilitate processing downlink spatial diverse wireless signaling generated from frequency diverse wireline signal transmitted over a wired communication medium of the HFC network, the UE comprising:
   a front end having a plurality of wireless ports for receiving the spatially diverse wireless signals;
   a radio frequency integrated circuit (RFIC) configured to frequency convert signals output from the front end as a function of the received wireless signals to a common frequency;
   a baseband processor configured to interface the frequency converted signal with a device connected thereto; and
   wherein the front end includes a frequency band switch for each of the wireless ports, each frequency band switch being operable between at least a first and second frequency band to facilitate interfacing wireless signals within the corresponding frequency band.

10. A multiple-input multiple-output (MIMO) user equipment (UE) operable with a hybrid fiber coaxial (HFC) network to facilitate processing downlink spatial diverse wireless signaling generated from frequency diverse wireline signal transmitted over a wired communication medium of the HFC network, the UE comprising:
    a front end having a plurality of wireless ports for receiving the spatially diverse wireless signals;
    a radio frequency integrated circuit (RFIC) configured to frequency convert signals output from the front end as a function of the received wireless signals to a common frequency;
    a baseband processor configured to interface the frequency converted signal with a device connected thereto;
    wherein the front end includes at least one output for respectively interfacing signals associated with each of the wireless ports with the RFIC;
    wherein the RFIC includes a frequency conversion unit for each of the outputs, each of the frequency conversion units including an independently controllable local oscillator to facilitate frequency conversion; and
    wherein the front end includes a diplex filter for each of the wireless ports, the diplex filter enabling the received wireless signals to be directed toward the RFIC and to direct uplink wireless signals received from the RFIC to be transmitted from the corresponding port.

* * * * *